(12) United States Patent
Wiacek et al.

(10) Patent No.: US 12,507,070 B2
(45) Date of Patent: Dec. 23, 2025

(54) 3GPP, 5G, AND LTE RANDOM ACCESS RESPONSE TIMING ADVANCE COMMAND CODING FOR SAFETY AND SECURITY-RELATED BREACH

(71) Applicant: Nokia Technologies Oy, Espoo (FI)

(72) Inventors: Fabian Wiacek, Warsaw (PL); Kamil Bechta, Wroclaw (PL)

(73) Assignee: Nokia Technologies Oy, Espoo (FI)

( * ) Notice: Subject to any disclaimer, the term of this patent is extended or adjusted under 35 U.S.C. 154(b) by 388 days.

(21) Appl. No.: 18/043,517

(22) PCT Filed: Oct. 4, 2021

(86) PCT No.: PCT/US2021/053306
§ 371 (c)(1),
(2) Date: Feb. 28, 2023

(87) PCT Pub. No.: WO2022/093483
PCT Pub. Date: May 5, 2022

(65) Prior Publication Data
US 2023/0328529 A1 Oct. 12, 2023

Related U.S. Application Data

(60) Provisional application No. 63/107,066, filed on Oct. 29, 2020.

(51) Int. Cl.
*H04W 12/122* (2021.01)
*H04W 56/00* (2009.01)

(52) U.S. Cl.
CPC ....... *H04W 12/122* (2021.01); *H04W 56/001* (2013.01); *H04W 56/0045* (2013.01)

(58) Field of Classification Search
None
See application file for complete search history.

(56) References Cited

U.S. PATENT DOCUMENTS

2014/0010218 A1* 1/2014 Persson ............... H04J 3/1694
370/337
2014/0204766 A1 7/2014 Immendorf et al.
(Continued)

FOREIGN PATENT DOCUMENTS

JP 2019016841 A * 1/2019
WO 2012/134359 A1 10/2012
(Continued)

OTHER PUBLICATIONS

"3rd Generation Partnership Project; Technical Specification Group Services and System Aspects Study on 5G Security Enhancement against False Base Stations (Release 16)", 3GPP TR 33.809, V0.9.0, May 2020, pp. 1-76.
(Continued)

*Primary Examiner* — Christopher M Crutchfield
(74) *Attorney, Agent, or Firm* — Barta Jones, PLLC

(57) ABSTRACT

A true TA is determined by a BS for a UE. The BS codes the true TA to a coded TA and sends the coded TA to the UE. The UE receives the coded TA from the BS and determines, based on the coded TA, a true TA for the UE to use for communications with the BS. A source BS, in response to a handover of a UE from the source BS to a target BS, determines an offset to be used to determine a value of a true TA between the UE and the target BS. The source BS sends the offset toward the UE and the target BS during a handover process for the handover. The UE receives the offset and a coded TA from the target BS and determines the true TA by adjusting the received coded TA with the received offset.

12 Claims, 20 Drawing Sheets

(56) References Cited

U.S. PATENT DOCUMENTS

| | | | |
|---|---|---|---|
| 2022/0167216 A1* | 5/2022 | Kolekar | ................ H04W 36/08 |
| 2023/0015550 A1* | 1/2023 | Lin | ....................... H04L 5/0032 |

FOREIGN PATENT DOCUMENTS

| | | | | |
|---|---|---|---|---|
| WO | WO 2017102249 | * | 6/2017 | |
| WO | WO-2017102249 A1 | * | 6/2017 | ............ H04W 12/06 |

OTHER PUBLICATIONS

"3rd Generation Partnership Project; Technical Specification Group Services and System Aspects; Security architecture and procedures for 5G system (Release 16)", 3GPP TS 33.501, V16.4.0, Sep. 2020, pp. 1-250.

Rupprecht et al., "Breaking LTE on Layer Two", IEEE Symposium on Security and Privacy (SP), vol. 1, 2019, pp. 1121-1136.

Rupprecht et al., "IMP4GT: IMPersonation Attacks in 4G NeTworks", Network and Distributed Systems Security (NDSS) Symposium, Feb. 23-26, 2020, pp. 1-15.

Akbar et al., "On the Pilot Contamination Attack in Multi-Cell Multiuser Massive MIMO Networks", IEEE Transactions on Communications, vol. 68, No. 4, Apr. 2020, pp. 2264-2276.

Clancy, "Efficient OFDM Denial: Pilot Jamming and Pilot Nulling", IEEE International Conference on Communications (ICC), Jun. 5-9, 2011, 5 pages.

Lichtman et al., "5G NR Jamming, Spoofing, and Sniffing: Threat Assessment and Mitigation", arXiv, Apr. 8, 2018, 6 pages.

"3rd Generation Partnership Project; Technical Specification Group Radio Access Network; NR; Physical layer procedures for data (Release 16)", 3GPP TS 38.214, V16.3.0, Sep. 2020, pp. 1-166.

"pCR to 33.809—New solution for KI #7 and KI #5, based on modified CSI reports", 3GPP TSG-SA3 Meeting #101e, S3-20xxxx, Agenda Item: 5.6, Nokia, Nov. 9, 20, 2020, 2 pages.

"3rd Generation Partnership Project; Technical Specification Group Radio Access Network; Evolved Universal Terrestrial Radio Access (E-UTRA): Medium Access Control (MAC) protocol specification (Release 16)", 3GPP TS 36.321, V16.2.0, Sep. 2020, pp. 1-141.

"3rd Generation Partnership Project; Technical Specification Group Radio Access Network; Evolved Universal Terrestrial Radio Access (E-UTRA); Physical layer procedures (Release 16)", 3GPP TS 36.213, V16.2.0, Jun. 2020, pp. 1-576.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 16)", 3GPP TS 36.300, V16.3.0, Sep. 2020, pp. 1-390.

"3rd Generation Partnership Project; Technical Specification Group Radio Access Network; NR; Physical layer procedures for control (Release 16)", 3GPP TS 38.213, V16.3.0, Sep. 2020, pp. 1-179.

"3rd Generation Partnership Project; Technical Specification Group Radio Access Network; Solutions for NR to support non-terrestrial networks (NTN) (Release 16)", 3GPP TR 38.821, V16.0.0, Dec. 2019, pp. 1-140.

"DOD Announces $600 Million for 5G Experimentation and Testing at Five Installations", U.S. Department of Defense, Retrieved on Feb. 1, 2023, Webpage available at : https://www.defense.gov/News/Releases/Release/Article/2376743/dod-announces-600-million-for-5g-experimentation-and-testing-at-five-installati/.

International Search Report and Written Opinion received for corresponding Patent Cooperation Treaty Application No. PCT/US2021/053302, dated Jan. 17, 2022, 11 pages.

"3rd Generation Partnership Project; Technical Specification Group Services and System Aspects Study on 5G Security Enhancement against False Base Stations (Release 17)", 3GPP TR 33.809, V0.10.0, Aug. 2020, pp. 1-88.

Invitation to Pay Additional Fees received for corresponding Patent Cooperation Treaty Application No. PCT/US2021/053306, dated Jan. 28, 2022, 10 pages.

International Search Report and Written Opinion received for corresponding Patent Cooperation Treaty Application No. PCT/US2021/053306, dated Mar. 21, 2022, 17 pages.

Office action received for corresponding European Patent Application No. 21801723.4, dated May 15, 2025, 8 pages.

* cited by examiner

LTE/5G: MSG1 Received

| Time | s | 00:00 | 05:00 | 10:00 |
|---|---|---|---|---|
| UE: | | | | |
| UE Distance to the Base Station | D[m] | 2000 | 2000 | 2000 |
| Selected Preamble | SP | 20 | 22 | 41 |
| User: | | | | |
| Static Offset | SO | 265 | 265 | 265 |
| Base Station: | | | | |
| Msg2 Tx System Frame Number | SFN | 983 | 574 | 878 |
| LTE True TA | TA | 26 | 26 | 26 |
| 5G True TA | TA | 820 | 820 | 820 |
| Base Station TA_PIN Coding: | | | | |
| LTE TA PIN | TA_PIN | 12 | 887 | 1210 |
| 5G TA PIN | TA_PIN | 2088 | 1681 | 2004 |
| LTE | TA Range | 1282 | | |
| 5G | TA Range | 3848 | | |
| SFN | SFN Range | 1024 | | |

| | | | | |
|---|---|---|---|---|
| Method LTE: MSG2 Send with TA Command: | TA | 12 | 887 | 1210 |
| Method 5G: MSG2 Send with TA Commannd: | TA | 2088 | 1681 | 2004 |
| 3GPP LTE: MSG2 Send with TA Commannd: | TA | 26 | 26 | 26 |
| 3GPP 5G: MSG2 Send with TA Commannd: | TA | 820 | 820 | 820 |

Note: The Authorized UE is static
Note2: The Unauthorized UE is static — 2130

LTE/5G MSG2 Received

| Time | s | 00:00 | 05:00 | 10:00 |
|---|---|---|---|---|
| Base Station: | | | | |
| LTE TA Command | TA_PIN | 12 | 887 | 1210 |
| 5G TA Command | TA_PIN | 2088 | 1681 | 2004 |
| User: | | | | |
| Static Offset | SO | 265 | 265 | 265 |
| The Authorized UE: | | | | |
| Msg2 Tx System Frame Number | SFN | 983 | 574 | 878 |
| Selected Preamble | SP | 20 | 22 | 41 |
| The Authorized UE TA Decoding: | | | | |
| LTE True TA | TA | 26 | 26 | 26 |
| 5G True TA | TA | 820 | 820 | 820 |
| The Authorized UE Corresponding Distance: | | | | |
| LTE | D[m] | 2028 | 2028 | 2028 |
| 5G | D[m] | 2001 | 2001 | 2001 |
| The Unauthorized UE Corresponding Distance: | | | | |
| LTE | d[m] | 936 | 69186 | 94380 |
| 5G | d[m] | 5094,72 | 4101,64 | 4889,76 |
| LTE | TA Range | 1282 | | |
| 5G | TA Range | 3848 | | |
| SFN | SFN Range | 1024 | | |

Note: The Authorized UE distance is static in the consecutive connection periods
Note2: The Unauthorized UE distance may look to be dynamic in the consecutive connection period

FIG. 22

3GPP, 5G, AND LTE RANDOM ACCESS RESPONSE TIMING ADVANCE COMMAND CODING FOR SAFETY AND SECURITY-RELATED BREACH

RELATED APPLICATION

This application was originally filed as PCT Application No. PCT/US2021/053306, filed on Oct. 4, 2021, which claims priority from U.S. Provisional Application No. 63/107,066, filed Oct. 29, 2020, each of which is incorporated herein by reference in its entirety.

TECHNICAL FIELD

These disclosures relate to 3GPP LTE and $5^{th}$ Generation (5G) New Radio (NR). More specifically, the disclosures relate to security and safety issues in 3GPP LTE and 5G NR.

BACKGROUND

False or fake base stations (FBSs) are considered to be a significant threat to mobile network operation. Thus, means to detect them are desired. The 3GPP (third generation partnership project) 5G (fifth generation) Security Specification (TS 33.501, where TS=technical specification) currently has no normative text on this. In its informal annex, some hints are given on how a network may detect the presence of FBSs by analyzing UE (user equipment) measurement reports. It further mentions that an operator may react by "informing legal authorities" about the FBS. The topic is currently being studied further by SA3, documented in 3GPP TR (technical report) 33.809.

There can be various types of FBSs, and various attacks carried out by them. Most known is the FBS acting as an IMSI (International Mobile Subscriber Identity) catcher in 3G/4G, which is not possible in 5G, where standardized encryption of the IMSI is used. Another type of FBS is a "Man-in-the-Middle FBS" (MitM-FBS), as mentioned in 3GPP TR 33.809 section 5.7. The TR states: "Without addressing the MitM threats, detection of false base stations and countermeasures against them have limited effectiveness."

An MitM-FBS may pose as a UE towards a true gNB (e.g., a 5G base station, BS), and may relay the traffic between the UE and the true gNB. The BS part and the UE part of the MitM-FBS may be split and may be at different locations, interconnected by some WAN, to create a distributed MitM-FBS.

It is necessary to develop methods for detecting the presence of a MitM-FBS for a specific radio connection between a UE and the LBS.

According to 3GPP 5G/LTE (where LTE=long-term evolution) standards, data encryption may be initiated after a UE Attach Request procedure is completed. This means that an initial message exchange, that is, Msg1 RACH (random access channel) and Msg2 RAR (random access response), is not protected or encrypted, and that data provided in these messages may be provided in plain form.

Msg1 is a Random Access Channel Preamble, which may be sent to the gNodeB or eNodeB node by a UE. The UE may gain information required for connection based on broadcasted cell data.

Msg2 is a Random Access Response (RAR), sent in response to the received Msg1. Among others, Msg2 contains TA Command, 11-bits LTE, 12-bits 5G, which provide a Timing Advance index value, which may be used by the UE for an uplink channel timing adjustment. Without a proper uplink channel timing adjustment, the UE may not be able to establish an RRC Connection. For more information, see 3GPP TS 36.213 V16.2.0 (2020-06).

As stated above, RAR content is not encrypted as it is sent before a UE Attach Request.

In 5G or LTE private networks, which shall provide an enhanced security level for a UE and also in military applications, there may be a risk that RAR may be intercepted by an unauthorized UE. This may be related to potential hostile actions against a 5G or LTE communication network in order to disrupt connections or gain unauthorized access to its radio resources, or may be related to a direct threat to users.

If the RAR is intercepted, it may be possible to determine a Timing Advance for a UE, even if its identity is not revealed. Consequently, the unauthorized recipient may be able to determine the location of the UE, which may be positioned in a TA-based (where TA=timing advance) range ring with respect to the base station, and further limited by cell coverage azimuth or beam size.

In LTE, one TA (ITA) is 78 m and, in 5G, one TA (ITA) is 2.44 m. In LTE, a cell azimuth may typically be 120 degrees, and in 5G, due to beamforming, the beam may be around 20 degrees wide. In this context, UE location may be estimated well based on intercepted RAR and TA Command.

As a consequence, the current 5G and LTE 3GPP solution for provision of a TA Command in a plain form in RAR may be considered to be a 5G and LTE safety- and security-related breach, especially if it is exploited by a potential hostile recipient. As indicated above, interception of RAR nay be relatively simple task. In addition, UE identity may be not essential as simple TA detection may confirm a presence of a given type of UE or associated user.

It is desired that this TA-Command-related vulnerability in the 5G and LTE standard be removed as it may expose the 5G and LTE infrastructure in safety- and security-related private networks or in military application to potential attacks, which in turn may degrade trust in the safety and security aspects of 5G and LTE techniques.

BRIEF SUMMARY

This section is intended to include examples and is not intended to be limiting.

In an exemplary embodiment, a method is disclosed that includes determining, by a base station in a wireless network, a true timing advance for a user equipment in the wireless network. The method includes coding, by the base station, the true timing advance to a coded timing advance, and sending, by the base station toward the user equipment, the coded timing advance.

An additional exemplary embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer. Another example is the computer program according to this paragraph, wherein the program is directly loadable into an internal memory of the computer.

An exemplary apparatus includes one or more processors and one or more memories including computer program code. The one or more memories and the computer program code are configured to, with the one or more processors, cause the apparatus at least to: determine, by a base station in a wireless network, a true timing advance for a user equipment in the wireless network; code, by the base station, the true timing advance to a coded timing advance; and send, by the base station toward the user equipment, the coded timing advance.

An exemplary computer program product includes a computer-readable storage medium bearing computer program code embodied therein for use with a computer. The computer program code includes: code for determining, by a base station in a wireless network, a true timing advance for a user equipment in the wireless network; code for coding, by the base station, the true timing advance to a coded timing advance; and code for sending, by the base station toward the user equipment, the coded timing advance.

In another exemplary embodiment, an apparatus comprises means for performing: determining, by a base station in a wireless network, a true timing advance for a user equipment in the wireless network; coding, by the base station, the true timing advance to a coded timing advance; and sending, by the base station toward the user equipment, the coded timing advance.

In an exemplary embodiment, a method is disclosed that includes receiving, by a user equipment in a wireless network, a coded timing advance from a base station in the wireless network; and determining, by the user equipment based on the coded timing advance, a true timing advance for the user equipment to use for communications with the base station.

An additional exemplary embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer. Another example is the computer program according to this paragraph, wherein the program is directly loadable into an internal memory of the computer.

An exemplary apparatus includes one or more processors and one or more memories including computer program code. The one or more memories and the computer program code are configured to, with the one or more processors, cause the apparatus at least to: receive, by a user equipment in a wireless network, a coded timing advance from a base station in the wireless network; and determine, by the user equipment based on the coded timing advance, a true timing advance for the user equipment to use for communications with the base station.

An exemplary computer program product includes a computer-readable storage medium bearing computer program code embodied therein for use with a computer. The computer program code includes: code for receiving, by a user equipment in a wireless network, a coded timing advance from a base station in the wireless network; and code for determining, by the user equipment based on the coded timing advance, a true timing advance for the user equipment to use for communications with the base station.

In another exemplary embodiment, an apparatus comprises means for performing: receiving, by a user equipment in a wireless network, a coded timing advance from a base station in the wireless network; and determining, by the user equipment based on the coded timing advance, a true timing advance for the user equipment to use for communications with the base station.

In a further exemplary embodiment, a method is disclosed that includes determining, by a source base station in response to a handover of a user equipment from the source base station to a target base station, an offset to be used to determine a value of a true timing advance between the user equipment and the target base station. The method includes sending by the source base station the offset toward the user equipment and the target base station during a handover process for the handover.

An additional exemplary embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer. Another example is the computer program according to this paragraph, wherein the program is directly loadable into an internal memory of the computer.

An exemplary apparatus includes one or more processors and one or more memories including computer program code. The one or more memories and the computer program code are configured to, with the one or more processors, cause the apparatus at least to: determine, by a source base station in response to a handover of a user equipment from the source base station to a target base station, an offset to be used to determine a value of a true timing advance between the user equipment and the target base station; and send by the source base station the offset toward the user equipment and the target base station during a handover process for the handover.

An exemplary computer program product includes a computer-readable storage medium bearing computer program code embodied therein for use with a computer. The computer program code includes: code for determining, by a source base station in response to a handover of a user equipment from the source base station to a target base station, an offset to be used to determine a value of a true timing advance between the user equipment and the target base station; and code for sending by the source base station the offset toward the user equipment and the target base station during a handover process for the handover.

In another exemplary embodiment, an apparatus comprises means for performing: determining, by a source base station in response to a handover of a user equipment from the source base station to a target base station, an offset to be used to determine a value of a true timing advance between the user equipment and the target base station; and sending by the source base station the offset toward the user equipment and the target base station during a handover process for the handover.

In an exemplary embodiment, a method is disclosed that includes receiving, by a user equipment as part of a handover process from a source base station to a target base station, an offset from the source base station to be used to determine a value of a true timing advance between the user equipment and the target base station. The method includes receiving a coded timing advance from a target base station during the handover process. The method also includes determining the value of the true timing advance by adjusting the received coded timing advance with the received offset.

An additional exemplary embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer. Another example is the computer program according to this paragraph, wherein the program is directly loadable into an internal memory of the computer.

An exemplary apparatus includes one or more processors and one or more memories including computer program code. The one or more memories and the computer program code are configured to, with the one or more processors, cause the apparatus at least to: receive, by a user equipment as part of a handover process from a source base station to a target base station, an offset from the source base station to be used to determine a value of a true timing advance between the user equipment and the target base station; receive a coded timing advance from a target base station during the handover process; and determine the value of the true timing advance by adjusting the received coded timing advance with the received offset.

An exemplary computer program product includes a computer-readable storage medium bearing computer program code embodied therein for use with a computer. The computer program code includes: code for receiving, by a user equipment as part of a handover process from a source base station to a target base station, an offset from the source base station to be used to determine a value of a true timing advance between the user equipment and the target base station; code for receiving a coded timing advance from a target base station during the handover process; and code for determining the value of the true timing advance by adjusting the received coded timing advance with the received offset.

In another exemplary embodiment, an apparatus comprises means for performing: receiving, by a user equipment as part of a handover process from a source base station to a target base station, an offset from the source base station to be used to determine a value of a true timing advance between the user equipment and the target base station; receiving a coded timing advance from a target base station during the handover process; and determining the value of the true timing advance by adjusting the received coded timing advance with the received offset.

In an exemplary embodiment, a method is disclosed that includes receiving, by a target base station in response to a handover of a user equipment from a source base station to the target base station, an offset to be used to determine a value of a true timing advance between the user equipment and the target base station; adjusting the true timing advance using the received offset to form a coded timing advance; and sending the coded timing advance from the target base station toward the user equipment.

An exemplary apparatus includes one or more processors and one or more memories including computer program code. The one or more memories and the computer program code are configured to, with the one or more processors, cause the apparatus at least to: receive, by a target base station in response to a handover of a user equipment from a source base station to the target base station, an offset to be used to determine a value of a true timing advance between the user equipment and the target base station; adjust the true timing advance using the received offset to form a coded timing advance; and send the coded timing advance from the target base station toward the user equipment.

An exemplary computer program product includes a computer-readable storage medium bearing computer program code embodied therein for use with a computer. The computer program code includes: code for receiving, by a target base station in response to a handover of a user equipment from a source base station to the target base station, an offset to be used to determine a value of a true timing advance between the user equipment and the target base station; code for adjusting the true timing advance using the received offset to form a coded timing advance; and code for sending the coded timing advance from the target base station toward the user equipment.

In another exemplary embodiment, an apparatus comprises means for performing: receiving, by a target base station in response to a handover of a user equipment from a source base station to the target base station, an offset to be used to determine a value of a true timing advance between the user equipment and the target base station; adjusting the true timing advance using the received offset to form a coded timing advance; and sending the coded timing advance from the target base station toward the user equipment.

BRIEF DESCRIPTION OF THE DRAWINGS

The foregoing and other aspects of these teachings are made more evident in the following detailed description, when read in conjunction with the attached drawing figures.

FIG. 21 illustrates an RAR TA Command coding process performed at a base station.

FIG. 22 illustrates an RAR TA Command decoding process performed at a UE.

DETAILED DESCRIPTION OF THE DRAWINGS

Figure 1:
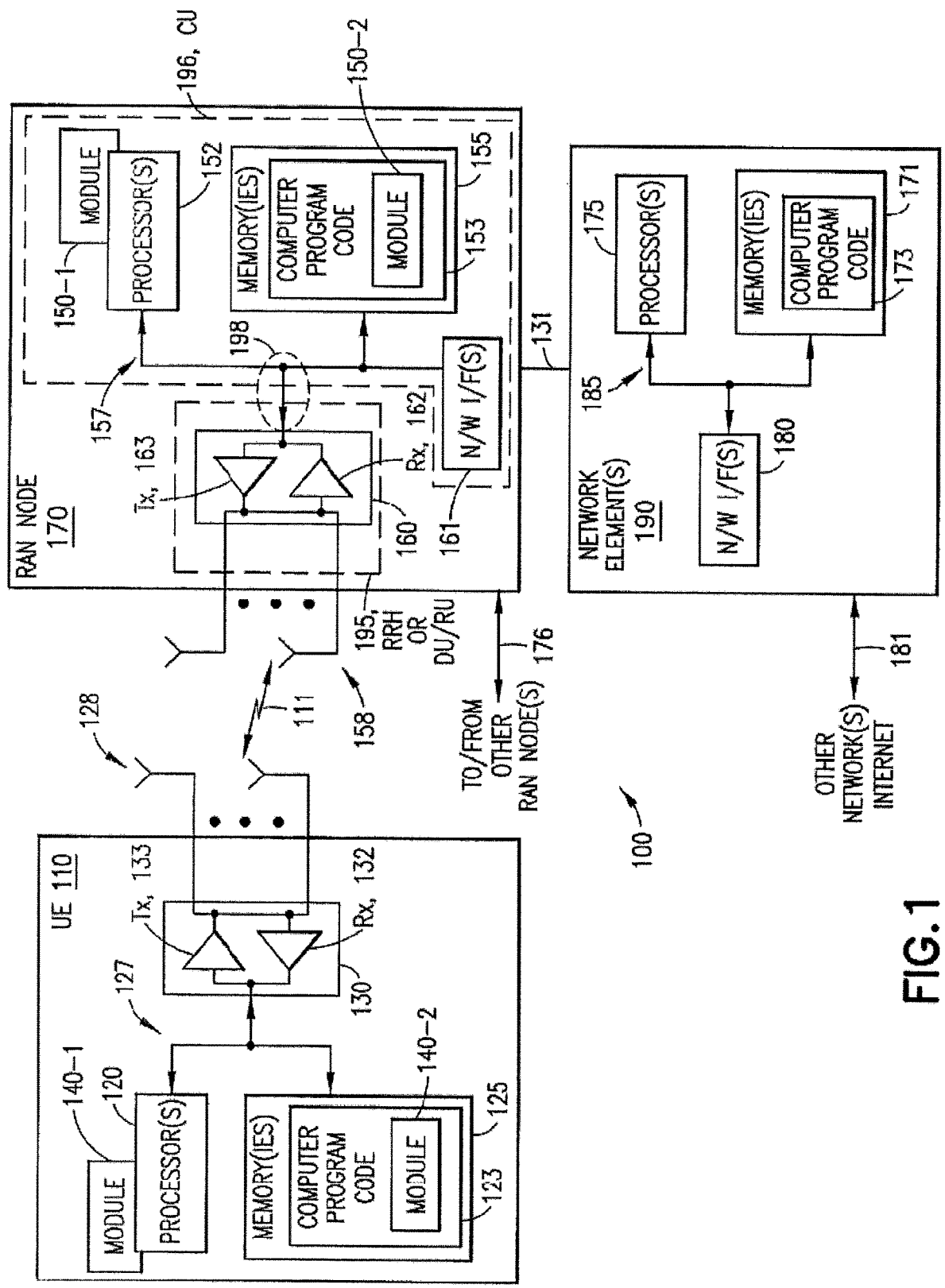
FIG. 1 shows a simplified block diagram of certain apparatus in which the subject matter of the present disclosure may be practiced.

Abbreviations that may be found in the specification and/or the drawing figures are defined below, at the end of the detailed description section.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

FIG. 1 is a block diagram of one possible and non-limiting example in which the subject matter of the present disclosure may be practiced. A user equipment (UE) 110, radio access network (RAN) node 170, and network element(s) 190 are illustrated. In the example of FIG. 1, the user equipment (UE) 110 is in wireless communication with a wireless network 100. A UE is a wireless device, such as a mobile device, that can access the wireless network. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a module 140, comprising one of or both parts 140-1 and/or 140-2, which may be implemented in a number of ways. The module 140 may be implemented in hardware as module 140-1, such as being implemented as part of the one or more processors 120. The module 140-1 may be implemented also as an integrated circuit or through other hardware such as a programmable gate array. In another example, the module 140 may be implemented as module 140-2, which is implemented as computer program code 123 and is executed by the one or more processors 120. For instance, the one or more memories 125 and the computer program code 123 may be configured, with the one or more processors 120, to cause the user equipment 110 to perform one or more of the operations as described herein. The UE 110 communicates with RAN node 170 via a wireless link 111.

The RAN node 170 in this example is a base station that provides access to wireless devices, such as the UE 110. The RAN node 170 may be, for example, a base station for 5G, also called New Radio (NR). In 5G, the RAN node 170 may be an NG-RAN node, which is defined as either a gNB or an ng-eNB. A gNB is a node providing NR user plane and control-plane protocol terminations toward the UE, and connected via the NG interface to a 5GC, such as, for example, the network element(s) 190. The ng-eNB is a node providing E-UTRA user plane and control plane protocol terminations towards the UE, and connected via the NG interface to the 5GC. In one of several approaches, the NG-RAN node may include multiple network elements, which may also include a centralized unit (CU)(gNB-CU) 196 and distributed unit(s) (DUs) (gNB-DUs), of which DU 195 is shown. Note that the DU may include or be coupled to and control a radio unit (RU). The gNB-CU is a logical node hosting RRC, SDAP and PDCP protocols of the gNB or RRC and PDCP protocols of the en-gNB that controls the operation of one or more gNB-DUs. The gNB-CU terminates the F1 interface connected with the gNB-DU. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU is a logical node hosting RLC, MAC and PHY layers of the gNB or ng-eNB, and its operation is partly controlled by gNB-CU. One gNB-CU supports one or multiple cells. One cell is supported by only one gNB-DU. The gNB-DU terminates the F1 interface 198 connected with the gNB-CU. Note that the DU 195 is considered to include the transceiver 160, for example, as part of a RU, but some examples of this may have the transceiver 160 as part of a separate RU, for example, under control of and connected to the DU 195. The RAN node 170 may also be an eNB (evolved NodeB) base station, for LTE (long term evolution), or any other suitable base station or node.

The preceding paragraph describes one way of splitting the gNB functions: other splits are possible as well with different distributions of [LOW-PHY/HIGH-PHY/PHY] MAC/RLC/PDCP[/SDAP]/RRC functions across the various network nodes and different interfaces for connecting the network nodes.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memories 155, and network interfaces 161. Note that the DU 195 may also contain its own memory/memories and processor(s), and/or other hardware, but these are not shown.

The RAN node 170 includes a module 150, comprising one of or both parts 150-1 and/or 150-2, which may be implemented in a number of ways. The module 150 may be implemented in hardware as module 150-1, such as being implemented as part of the one or more processors 152. The module 150-1 may be implemented also as an integrated circuit or through other hardware such as a programmable gate array. In another example, module 150 may be implemented as module 150-2, which is implemented as computer program code 153 executed by the one or more processors 152. For instance, the one or more memories 155 and the computer program code 153 are configured, with the one or more processors 152, to cause the RAN node 170 to perform one or more of the operations as described herein. Note that the functionality of the module 150 may be distributed, such as being distributed between the DU 195 and the CU 196, or be implemented solely in the CU 196.

The one or more network interfaces 161 communicate over a network such as via the links 176 and 131. Two or more gNBs 170 may communicate using, e.g., link 176. The link 176 may be wired or wireless or both and may implement, for example, an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU, and the one or more buses 157 could be implemented in part as, for example, fiber optic cable or other suitable network connection to connect the other elements (e.g., a centralized unit (CU), gNB-CU) of the RAN node 170 to the RRH/DU 195. Reference 198 also indicates those suitable network link(s).

It is noted that description herein indicates that "cells" perform functions, but it should be clear that equipment which forms the cell will perform the functions. The cell makes up part of a base station. That is, there can be multiple cells per base station. For example, there could be three cells for a single carrier frequency and associated bandwidth, each cell covering one-third of a 360° area so that the single base station's coverage area covers an approximate oval or circle. Furthermore, each cell can correspond to a single carrier and a base station may use multiple carriers. So, if there are three 120° cells per carrier and two carriers, then the base station has a total of six cells.

The wireless network 100 may include a network element or elements 190 that may include core network functionality, and which provides connectivity via a link or links 181 with a further network, such as a telephone network and/or a data communications network (e.g., the Internet). Such core network functionality for 5G may include access and mobility management function(s) (AMF(S)) and/or user plane functions (UPF(s)) and/or session management function(s) (SMF(s)). Such core network functionality for LTE may include MME (Mobility Management Entity)/SGW (Serving Gateway) functionality. These are merely exemplary functions that may be supported by the network element(s) 190, and note that both 5G and LTE functions might be supported. The RAN node 170 is coupled via a link 131 to a network element 190. The link 131 may be implemented as, for example, an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured, with the one or more processors 175, to cause the network element 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer-readable memories 125, 155, and 171 may be of any type suitable to the local technical environment and may be implemented using any suitable data storage technology, such as semiconductor-based memory devices, flash memory, magnetic memory devices and systems, optical memory devices and systems, fixed memory and removable memory. The computer-readable memories 125, 155, and 171 may be means for performing storage functions.

The processors 120, 152, and 175 may be of any type suitable to the local technical environment, and may include one or more of general-purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

The user equipment 110 may also refer to Internet of Things (IoT) devices, massive industrial networks, smart city infrastructure, wearable devices, networked medical devices, autonomous devices, etc. These types of UE devices may operate for extended periods of time without human intervention (e.g., perform maintenance, replace or recharge an on-device battery, etc.), may have reduced processing power and/or memory storage, may have reduced battery storage capability due to having small form factors, may be integrated into machinery (e.g., heavy machinery, factory machinery, sealed devices, etc.), may be installed/located in hazardous environment or difficult to access environments, etc.

Figure 2:
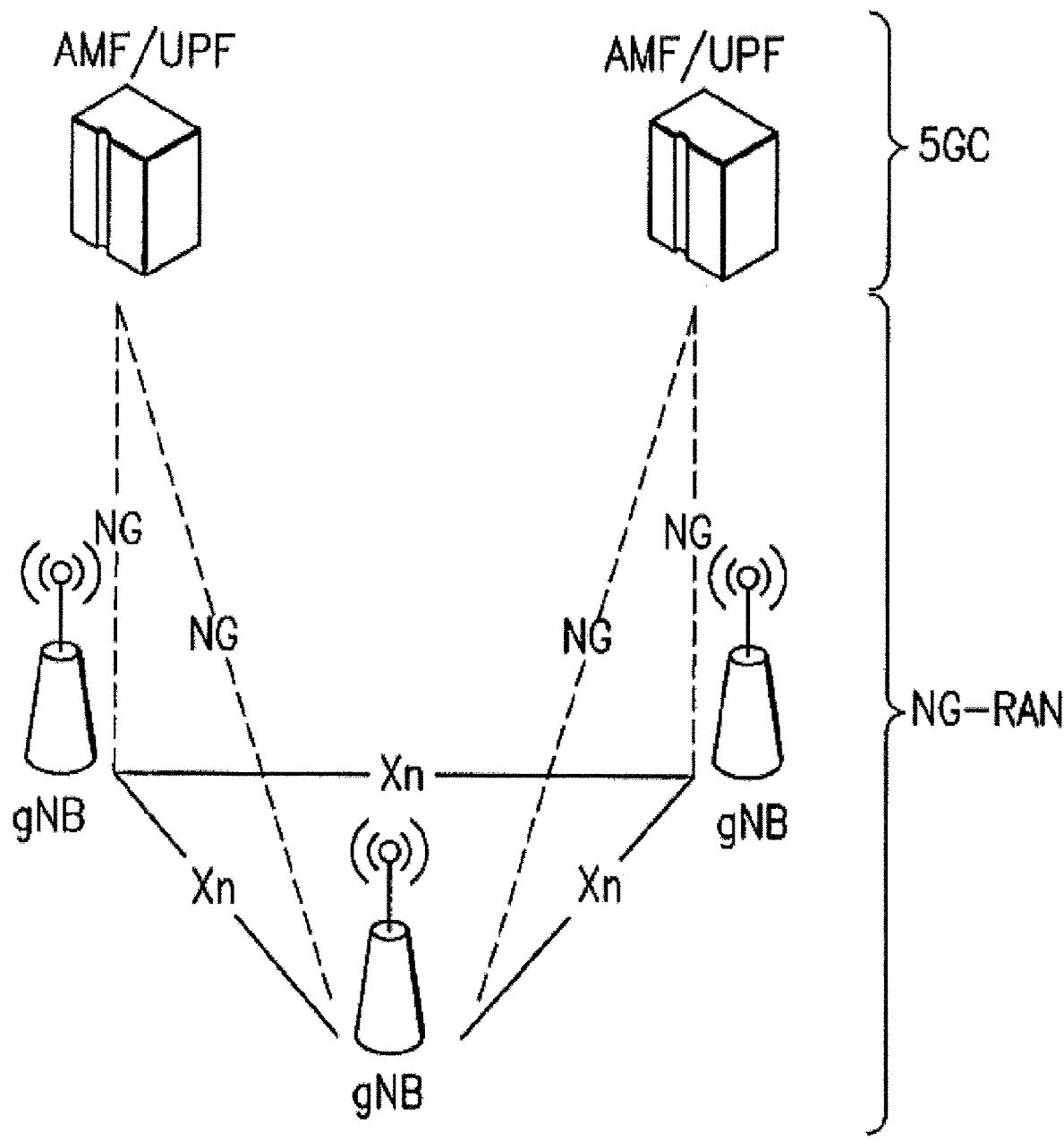
FIGS. 2 and 3 show an example of New Radio (NR) architecture having the 5G core (5GC) and the NG-RAN.
Figure 3:
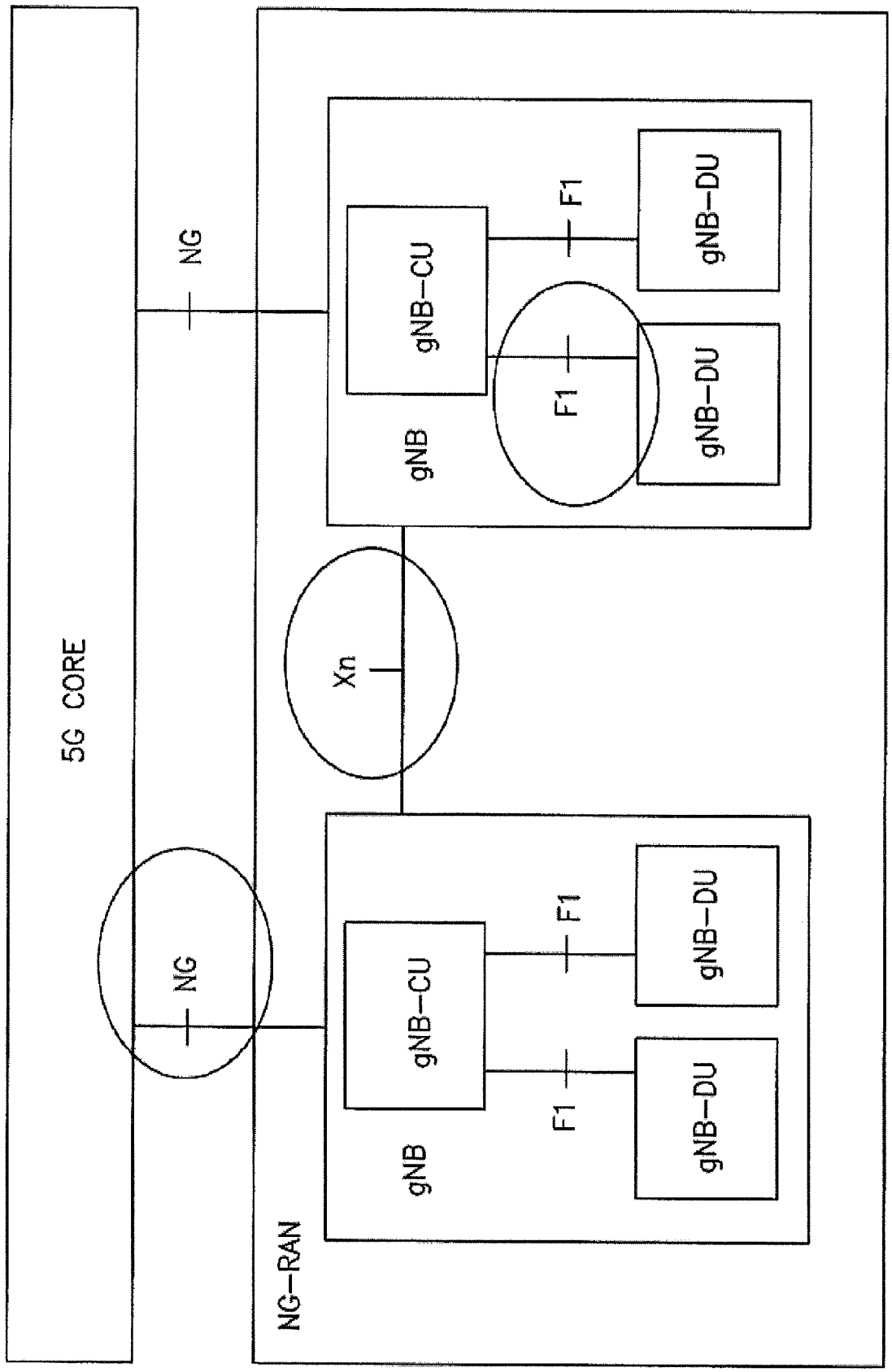

FIGS. 2 and 3 show an example of New Radio (NR) architecture having the 5G core (5GC) and the NG-RAN. The base stations gNB are coupled to the 5GC by the interface to core NGs, and the gNBs are coupled to each other by the inter-base station interface Xn.

As noted above, an MitM-FBS may pose as a UE towards a true gNB, and relay the traffic between the UE and the true gNB. The BS part and the UE part of the MitM-FBS may be split and may be at different locations, interconnected by some WAN, to create a distributed MitM-FBS, as illustrated in FIG. 4.

Figure 4:
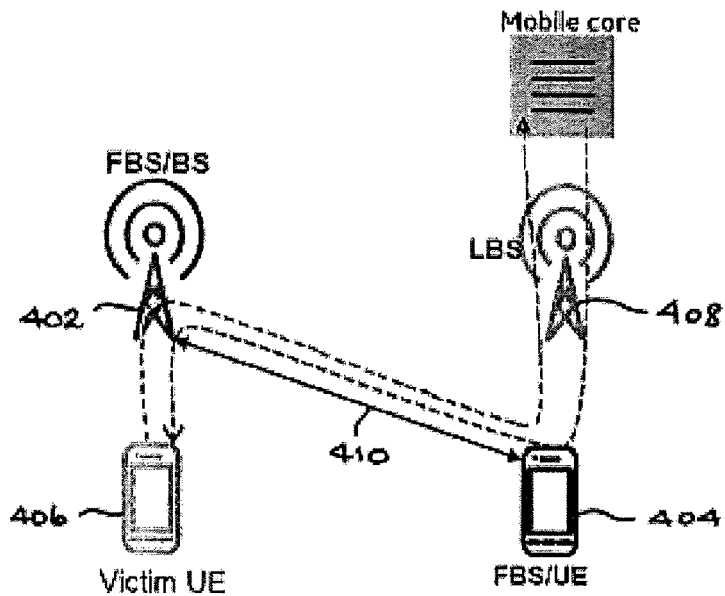
FIG. 4 illustrates a False Base Station (FBS) scenario.

FIG. 4 illustrates a False Base Station (FBS) scenario.

The MitM-FBS comprises two elements, FBS/BS 402 and FBS/UE 404. These two elements may be distributed or co-located. The FBS/BS 402 appears to the victim UE 406 as its serving BS (LBS) 408. The FBS/BS 402 and FBS/UE 404 are interconnected via an internal or NW interface 410. The FBS/UE 404 impersonates the victim UE 406 for the legitimate base station (LBS) 408. The FBS/BS 402 is the MAC protocol end point for the victim UE 406. Similarly, the LBS 408 is the MAC protocol end point for the FBS/UE 404. The FBS is a pass-through for the RRC as well as the NAS, RLC and user plane protocols.

The victim UE 406 and the LBS 408 can communicate secretly using the RRC level protocol, which is encrypted.

An MitM-FBS cannot read or modify the protected traffic. But, it can read or modify any unprotected traffic, such as:
the pre-authentication traffic;
traffic in an unauthenticated emergency call;
unauthenticated traffic to restricted local operator services (PARLOS-feature); and/or messages below the PDCP layer, like MAC control messages.

An MitM-FBS can drop messages. An MitM-FBS can also insert messages, including replay of earlier messages with valid MAC. Message insertion, however, will be detected, if integrity/replay protection is applied. If integrity protection is not used in the U-plane, the MitM-FBS can insert traffic without the receiver being able to detect this (apart from noticing—if encryption is used—that (inserted) messages decrypt to malformed messages). If encryption is not used, the MitM-FBS can eavesdrop the traffic (U- and C-plane) and it can insert cleartext without the receiver being able to detect this, if integrity protection also is not used.

Well-known attacks relaying on an MitM-FBS are "aLTEr" and "IMP4GT". They can be mitigated by using integrity protection for the user plane (not available in 5G NSA and in LTE; optional to use in 5G SA; support up to 64 kbit/s required for the UE in Rel. 15 SA, support up to full UE rate required for UE in Rel. 16 SA). But, even if it is supported, integrity protection may not be used as a rule—it is optional to use according to the standard. There are also some other measures an operator can apply to mitigate these attacks, such as additional security for DNS traffic, or restricting the use of ICMP messages that are used by the IMP4GT attack.

A MitM-FBS may also act as a very stealthy and targeted jammer, in the sense that it prevents radio interface communication between a selected UE and the network. Rather than sending a strong jamming signal that can be detected and localized easily, the FBS may, for example, send fake MAC control messages that cause the UE to modify its transmission in a way that the transmission from the UE to the network fails.

Needless to say, this type of DoS attack is serious in many of the mission critical use cases where high service availability is crucial, such as:

Industrial IoT: Critical industries have no tolerance to the disruption of their production lines or operations due to the unavailability or unreliability of their communication channels.

Autonomous guided Vehicles (AGV).

Drone control.

Autonomous Driving.

As detailed above, an MitM-FBS, that relays signals between a UE and the network (the legitimate BS, LBS) and can perform various meaningful attacks, may be present. The MitM-FBS may be set up and operated in a way that it is tightly mimicking the LBS and cannot easily be detected. The problem is how to detect the presence of a MitM-FBS for a specific radio connection between a UE and the LBS.

According to the present disclosure, after access stratum security is set up, UE and gNB agree via encrypted RRC communication on a temporary modification of the CSI reporting. CSI reports will be altered during an agreed time period by the UE in a way that the report still looks valid to an FBS. However, the FBS will interpret the CSI report incorrectly, leading to a notable deterioration of the reception of the radio signal by the UE. If no FBS is present, no such deterioration will happen. The UE reports back to the gNB in encrypted RRC communication whether a deterioration happened. Thus, the network detects that the radio traffic is relayed via a MitM-FBS.

The procedure may be triggered on a routine basis, such as once per hour, or on demand, such as when the presence of an MitM-FBS is suspected due to other indications. The gNB may decide to carry out the procedure with multiple UEs to increase the reliability of the detection.

In carrying out the procedure, secret information is exchanged between the LBS and the UE. The secret information comprises an activation instant; an activation duration; and a secret. This is described in more detail below.

The secret information is exchanged in RRC messages. For this reason, encryption must not be deactivated for RRC. The FBS only sees the encrypted message, but cannot derive the cleartext content.

Moreover, the secret information should be passed in a way that analysis of the encrypted traffic does not allow detection of the transmission of such information, as would be the case, for example, when the secret information is sent in a dedicated message type with a unique message size.

Detection is based on modified CSI reports. Based on the secret agreement between the LBS and the UE, the UE sends modified, that is, encrypted, CSI reports. These reports look like normal CSI reports, except that the PMI field has been modified (encrypted). These modified CSI reports are correctly interpretable by the LBS. When the FBS exploits these reports, it will pre-code them in wrong directions, and the UE will not receive any signals, or will receive them at weak power.

Figure 5:
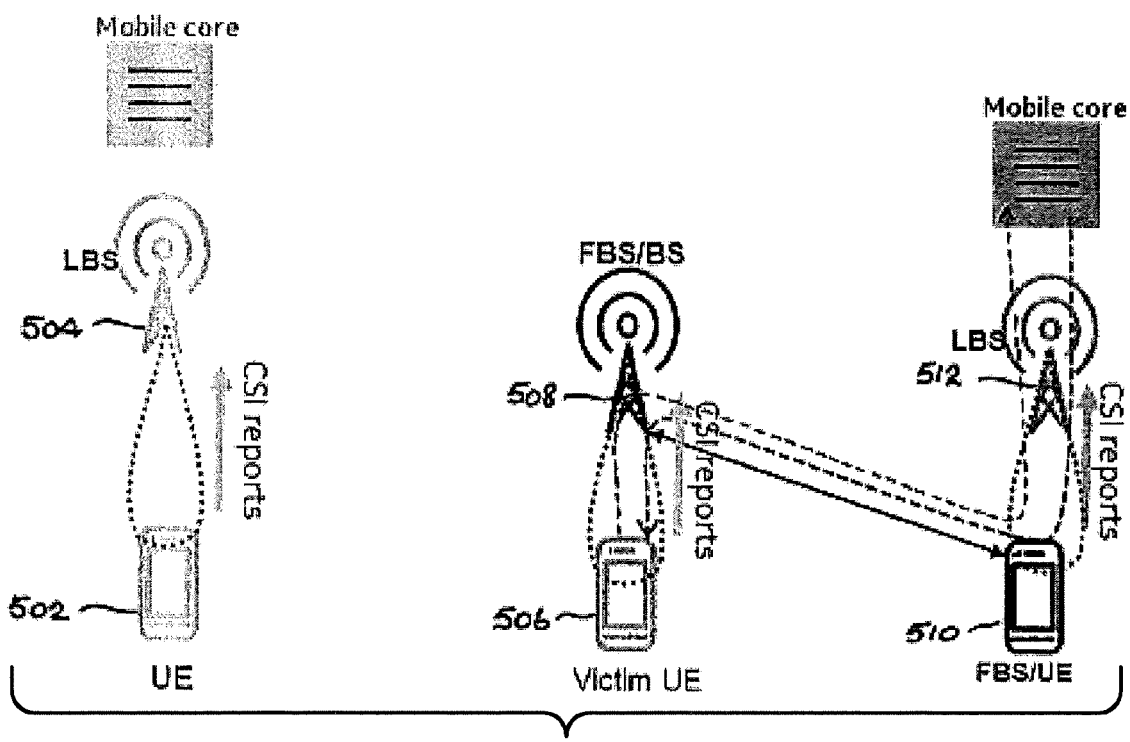
FIG. 5 illustrates an operation before the disclosed detection mechanism is activated.

The operation, prior to the activation of the detection mechanism, is illustrated in FIG. 5.

Referring first to the left side of FIG. 5, the UE 502 receives a signal from the LBS 504 at nominal power, and reports CSI conventionally. But, referring to the right side of FIG. 5, in the presence of an FBS, the victim UE 506 camps on a cell of the FBS, and reports channel measurements (CSI reports) to the FBS/BS 508. The FBS pre-codes the DL signal based on the CSI reports received from the victim UE 506. In parallel, the FBS/UE 510 sends CSI reports to the LBS 512 which, on its side, pre-codes towards the FBS/UE 510.

Figure 6:
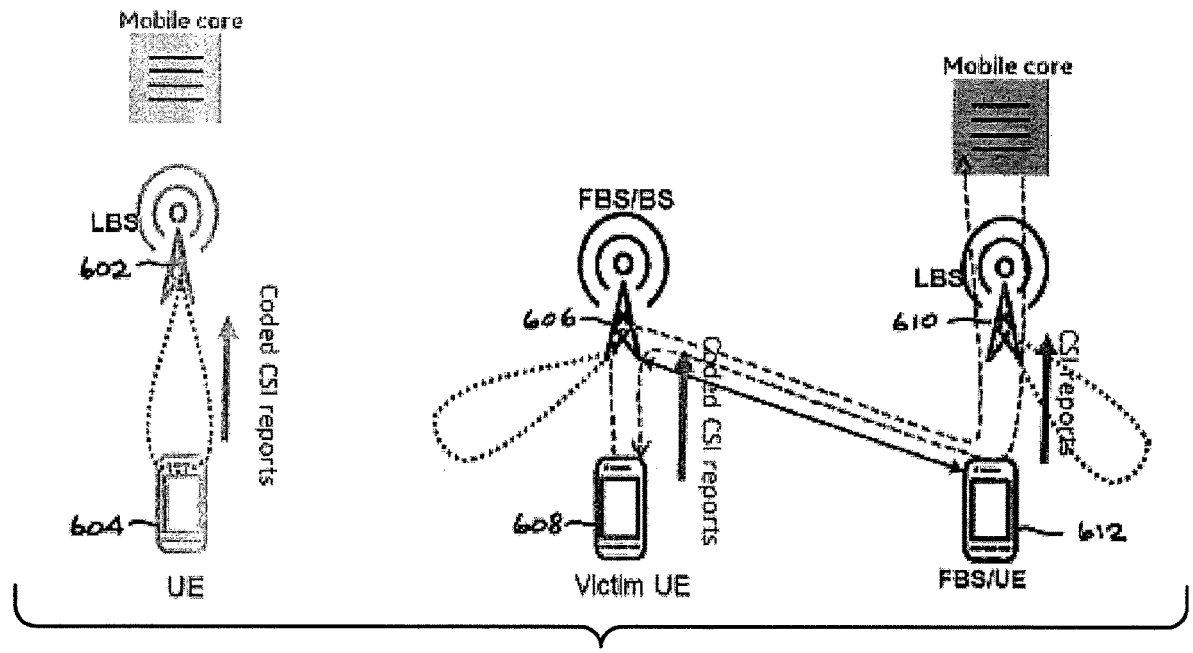
FIG. 6 illustrates an operation after the disclosed detection mechanism is activated.

The operation, after the activation of the detection mechanism, is illustrated in FIG. 6.

The detection is carried out as follows. Referring first to the left side of FIG. 6, in the absence of an FBS, the LBS 602 interprets and correctly decodes the CSI reports sent by the UE 604, and will pre-code towards the UE using the decoded CSI. The UE 604 will receive the signal at nominal power.

On the other hand, referring to the right side of FIG. 6, in the presence of an FBS, the FBS/BS 606 will interpret the CSI reports from the victim UE 608 incorrectly, and will pre-code in a wrong manner. As a consequence, the victim UE 608 will receive only noise, or a signal at a much weaker power. In parallel, the LBS 610 will receive un-coded CSI reports from the FBS/UE 612, but will treat them as if they were encoded. In consequence, the LBS 610 will pre-code them wrongly, and the DL communications between the LBS 610 and the FBS/UE 612 will be severely disturbed or broken.

The operation can be repeated with different CSI report encodings. In the presence of an FBS, the UE will measure significant variations in received power when the encryption method is modified. These power variations happening at predefined times will reveal the presence of an FBS, and can be distinguished from the natural pathloss and fading since they happen abruptly at known instants of time. The detection of fluctuating received powers is an indication that the UE is connected to an FBS.

In the presence of an FBS, the two radio channels, that is, victim UE 608 to FBS/BS 606 and FBS/UE 612 to LBS 610, are severely disturbed; in consequence, the user and control plane data does not go through. The breaking of the connection at the two ends, victim UE 608 and LBS 610, at the precise moment when the detection mode is activated is a very reliable indication of the presence of an FBS.

Because of the operation, the two ends, victim UE 608 and LBS 610, are made aware of the presence of an FBS, and can take appropriate measures, the most straightforward being to stop any transmission.

Figure 7:
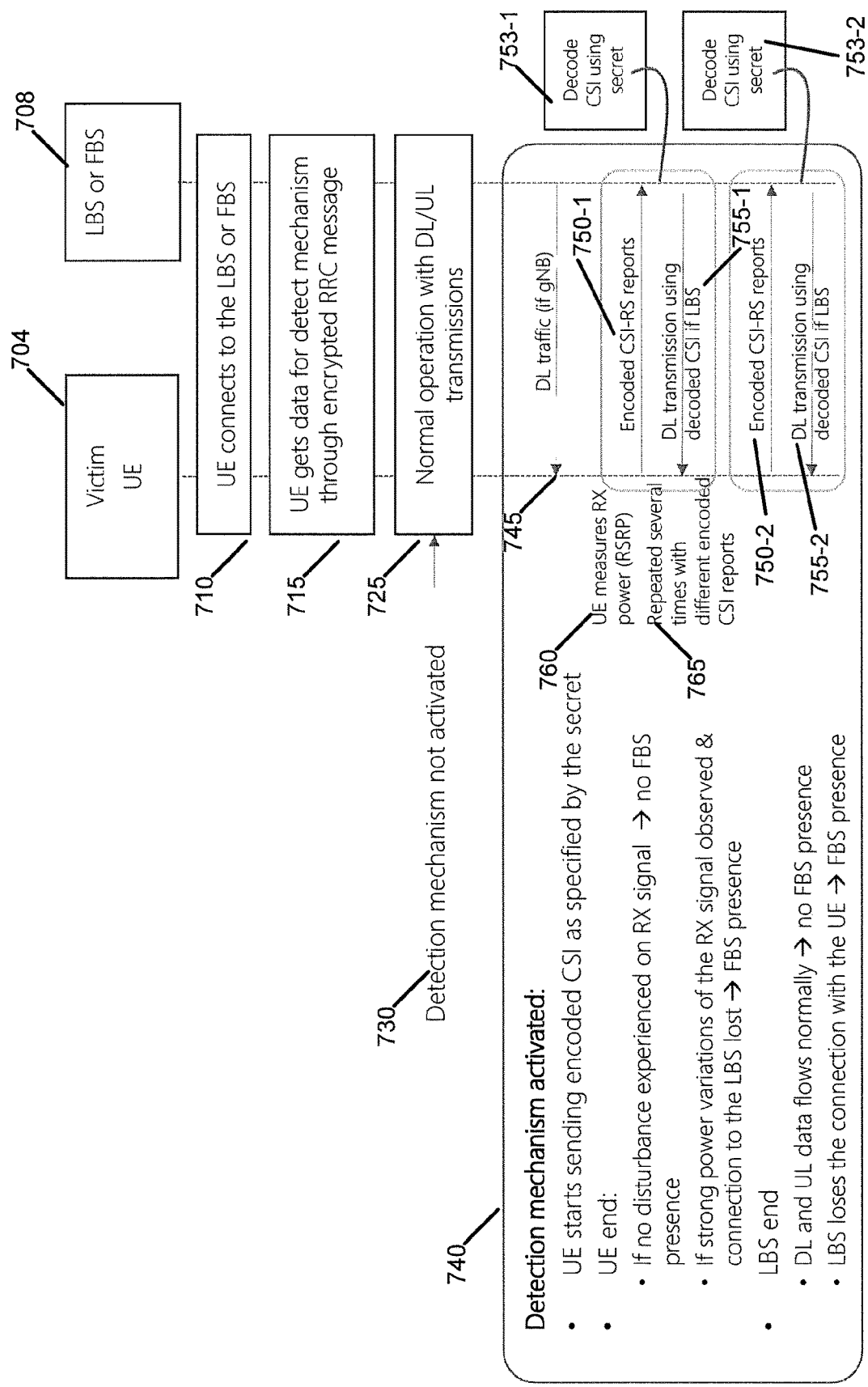
FIG. 7 is a flowchart of the operations before and after the disclosed detection mechanism is activated.

FIG. 7 is a flowchart of the operations before and after the disclosed detection mechanism is activated. There is a victim UE 704 and an LBS or FBS 708. In block 710, the UE connects to the LBS or FBS 708. The UE in block 715 gets data for a detect mechanism though an encrypted RRC message. The data includes secret information that is exchanged between the LBS and the UE. The secret information may comprise an activation instant; an activation duration; and a secret. CSI may be modified in a time period based at least on the activation instant and the activation duration. At this point, there are two possibilities, the detection mechanism not activated (block 730), or the detection mechanism is activated (block 740).

If the detection mechanism is not activated, block 725 is performed where normal operation with DL/UL transmissions are performed. These are between the victim UE 704 and the LBS or FBS 708.

If the detection mechanism is activated, block 740 is performed. The UE starts sending encoded CSI as specified by the secret. At the UE end: if not disturbance is experienced on the RX signal, there is no FBS presence; if strong power variations of the RX signal are observed and connection to the LBS is lost, then there is an FBS presence. At the LBS end: if DL and UL data flows normally, there is no FBS presence; if the LBS loses the connection with the UE, there is an FBS presence.

Additionally, reference 745 signaling indicates there is DL traffic (if gNB, i.e., LBS). As indicated by reference 760, the UE measures RX power (e.g., RSRP). Signaling 750-1 indicates this is communicated to the LBS or FBS 708 via encoded CSI-RS reports, and signaling 755-1 has the LBS 708 sending a DL transmission using decoded CSI if LBS. In block 753-1, the LBS 708 decodes the CSI using the secret. Reference 765 indicates these are repeated several times with different encoded CSI reports. This is indicated in signaling 750-2, which indicates this is communicated to the LBS or FBS 708 via encoded CSI-RS reports, and signaling 755-2, which has the LBS 708 sending a DL transmission using decoded CSI if LBS. See also block 753-3, where the LBS 708 decodes the CSI using the secret. It is noted the FBS cannot decode the actual CSI without the secret.

As indicated above, the CSI report encryption method will now be described. 5G CSI reports contain the following fields:

CQI (Channel Quality Information);
PMI (Precoding Matrix Indicator);
CRI (CSI-RS Resource Indicator);
SSRBI (SS/PBCH Resource Block Indicator);
LI (Layer Indicator); and
RI (Rank Indicator) and/or L1-RSRP (Layer 1-Reference Signal Received Power).

The present detection mechanism will keep most fields unchanged, except for the PMI field. The precoding matrix determines how the individual data streams (called layers in LTE) are mapped to the antennas. The 5G framework contains a lot of options, as described in 3GPP TS 38.214.

As an illustration, the PMI encryption principle of the present disclosure is described here in the configuration mode: 'Type I Single Beam (L=1) Codebooks: Rank 1'. The principle can be readily extended to other modes. In this mode, the UE reports the coordinates of the beam it receives at the highest power, as illustrated in FIG. 8.

Figure 8:
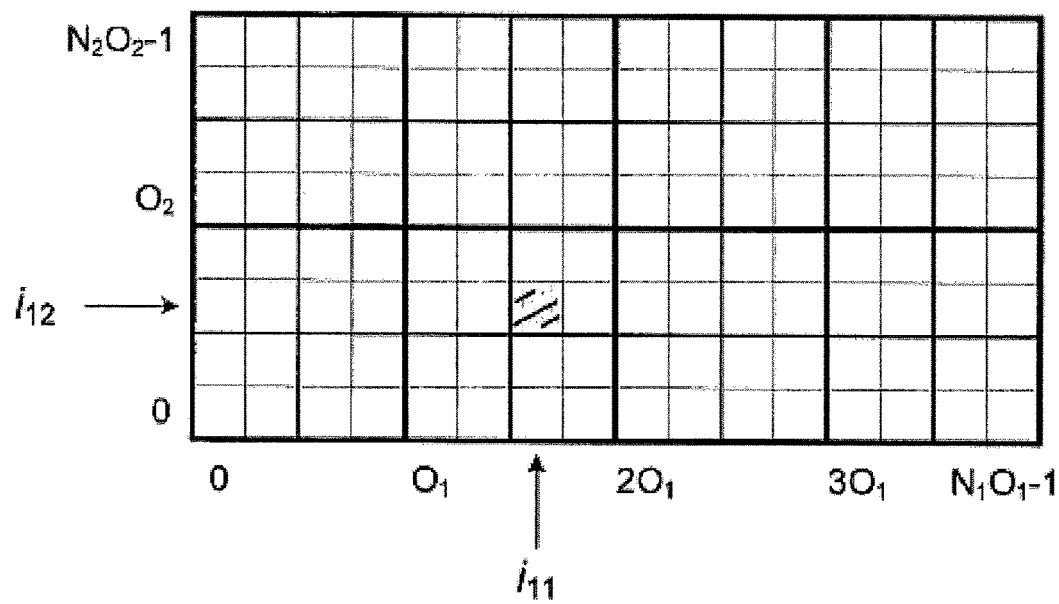
FIG. 8 illustrates a beam grid.

FIG. 8 illustrates a beam grid, and a selected beam in Type 1, Rank 1. On the horizontal and vertical axes, "O" refers to the spatial oversampling factor. $N_1$ and $N_2$ correspond respectively to the azimuth and elevation of the beams. The coordinates in FIG. 8 are two integer numbers, $i_{11}$ and $i_{12}$, for the horizontal (azimuth) and vertical (elevation) directions, respectively.

The principle of the encryption is to apply perturbations to at least part of these values.

For example, with $i_{11} \in \{0,15\}$ and $i_{12} \in \{0,7\}$ as shown in FIG. 8, the UE, at a fixed position, should normally report [6, 2] when the detection mechanism is inactive. When the detection mechanism is activated, the UE will actually send a modified series of PMI reports: [6, 2], [7, 1], [8, 1], [12, 2], etc.

The series of modified reports should preferably correspond to a realistic device trajectory. The secret agreement defining the fake trajectory of the UE can therefore be a pseudo-random suite with elements in $\{0, +1, -1, +2, -2\}$ applied separately to each beam coordinate with a saturation when the edge of the rectangle is reached. Saturation happens when the modified CSI is beyond the grid of beam space. In that case, the maximum or minimum value allowed in the grid may be used. This method makes the FBS think that the UE is moving.

The secret agreement uses a secret. It is important that without the possession of this secret, the original (unmodified) information cannot be retrieved. In this sense, the original information is "encrypted". So, the false base station cannot retrieve the original information, even if the false base station had the suspicion that a modification has happened. The genuine base station, however, can retrieve the original information. The secret may be used to generate the suite of random numbers (e.g., can be used as a seed). The process of generating pseudo-random numbers based on a secret is well known. These random numbers are used to perturbate the CSI reported by the UE, via the pseudo-random seed.

It should be noted that the worst-case assumption, that the FBS may check the likelihood of the reported CSI regarding the trajectory, is being made. This might not be the case in practice, and we could send random suites of beams coordinates as an alternative. That is, the sent random numbers may not have any relationship to a trajectory.

Some advantages of this disclosure are that the procedure allows reliable detection of types of MitM-FBSs that let the UE communicate with the network. If an FBS does not let the UE communicate with the network, this is obviously realized by the UE, and the UE may not select the cell(s) of the FBS anymore after some unsuccessful trials.

Moreover, it is not necessary that every UE support the procedure. An MitM-FBS may be detected based on one UE that supports the procedure and has selected a cell of the MitM-FBS.

The effectiveness of the method does not depend on secrecy of the method itself, but on the secrecy of the transmitted information about CSI report modification, which can be guaranteed by standardized RRC encryption.

If the FBS is aware of the detection method, it can detect when the detection mode is activated, since it observes strong power variations of the RX signal from the LBS, but the FBS has no way to continue to hide since it does not know the secret.

Figure 9:
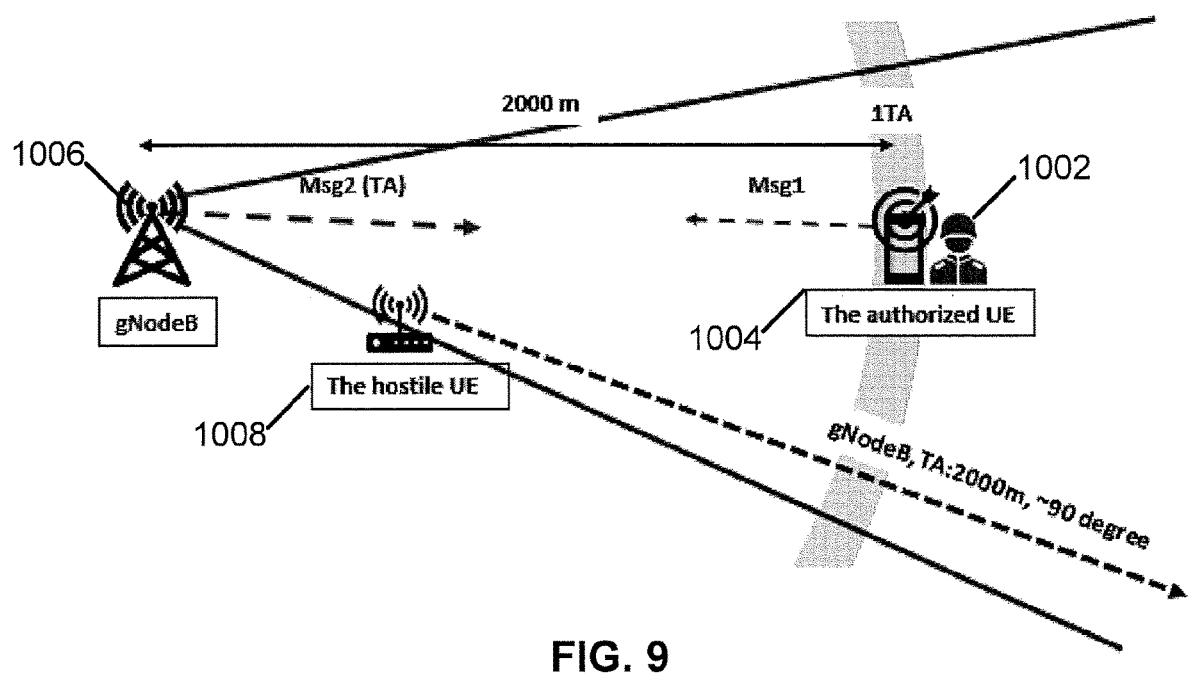
FIG. 9 illustrates the interception of RAR with TA in a direct form.

FIG. 9 illustrates the interception of RAR with TA in a direct form, and provides a first example of a potentially lethal scenario in military 5G or LTE applications, if Msg2 TA-related security breach is exploited by a hostile recipient. As illustrated, a soldier 1002 may initiate a 5G or LTE connection from his UE 1004 towards its own 5G (LTE) gNodeB 1006 by sending a Random Access Channel Preamble Msg1. In a response, the gNodeB 1006 may send a Random Access Response Msg2, which may include a TA Command. Msg2 may be intercepted by a hostile UE 1008, which may be, for example, an NB-IoT device optimized for the detection of 5G (LTE) transmissions.

It should be noted that cell configuration parameters may be openly broadcasted or transmitted by the base station and that any UE in the cell coverage may be able to determine at which 5G or LTE radio resources RAR may be sent.

In a next step, the hostile UE 1008 may report intercepted TA data together with azimuth estimations. This is indicated on the figure as being to a gNodeB, with a TA of 2000 m and about an azimuth of 90 degrees. These data may be used for further processing, in which an exact UE and associated user position may be determined, for example, by merging with a terrain map.

It should also be noted that a relatively narrow 5G beam may not guarantee that TA-related vulnerability will not be further exploited as, for example, there may be more than one hostile UE 1008 in the coverage. In addition, it should be noted that beam azimuth may be determined by power measurement or that Msg1 may be also intercepted and associated with the given beam swap pattern. In this context, FIG. 9 shows a simplified scenario.

Figure 10:
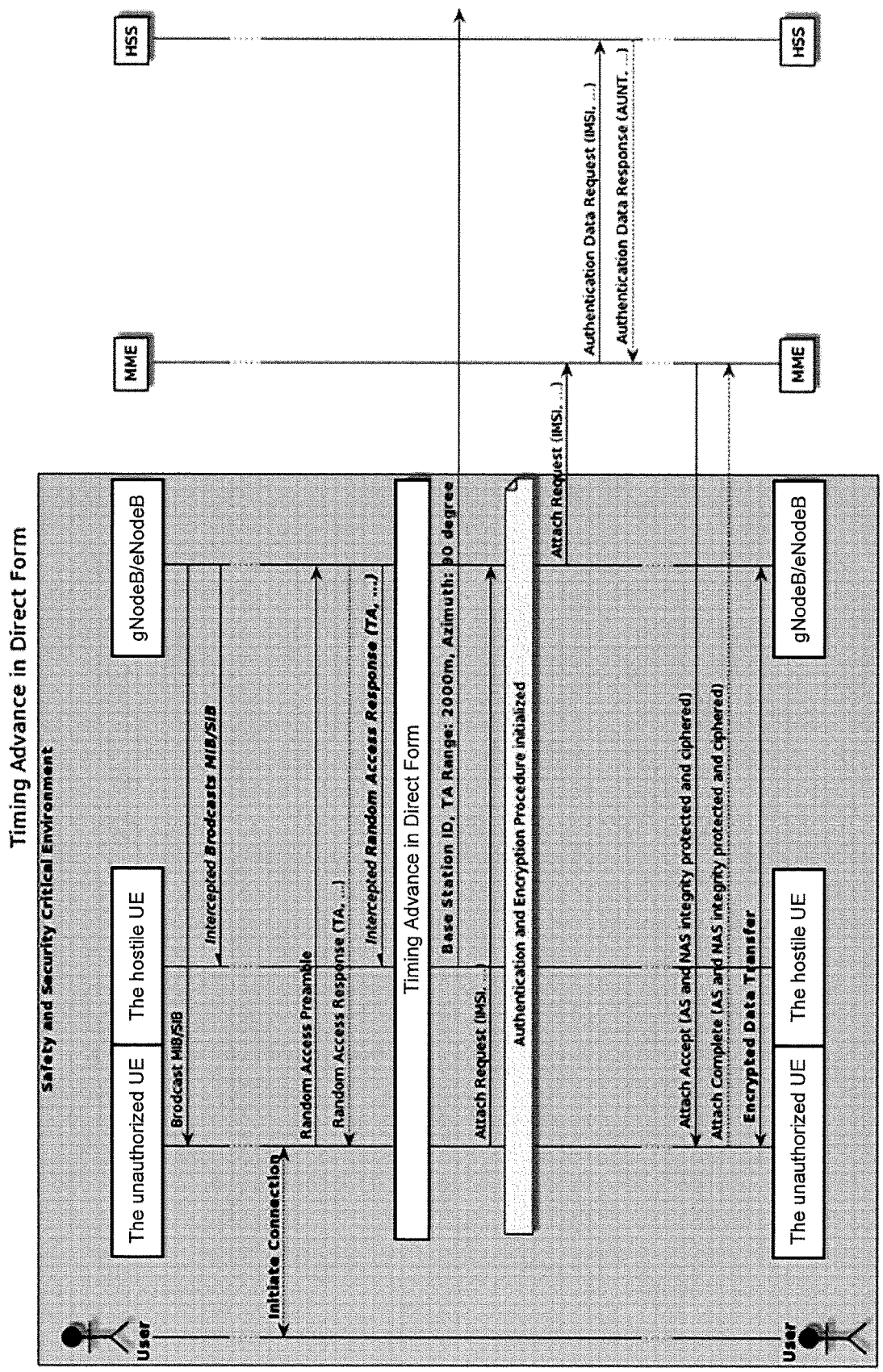
FIG. 10 illustrates the scenario shown in FIG. 9 from a signaling point of view.

FIG. 10 illustrates the scenario shown in FIG. 9 from a signaling point of view. As indicated, RAR interception may take place before a UE Attach Request Msg3, which may mean that the content of RAR may not be cyphered or encrypted; thus, it may be vulnerable for easily decoding.

Figure 11:
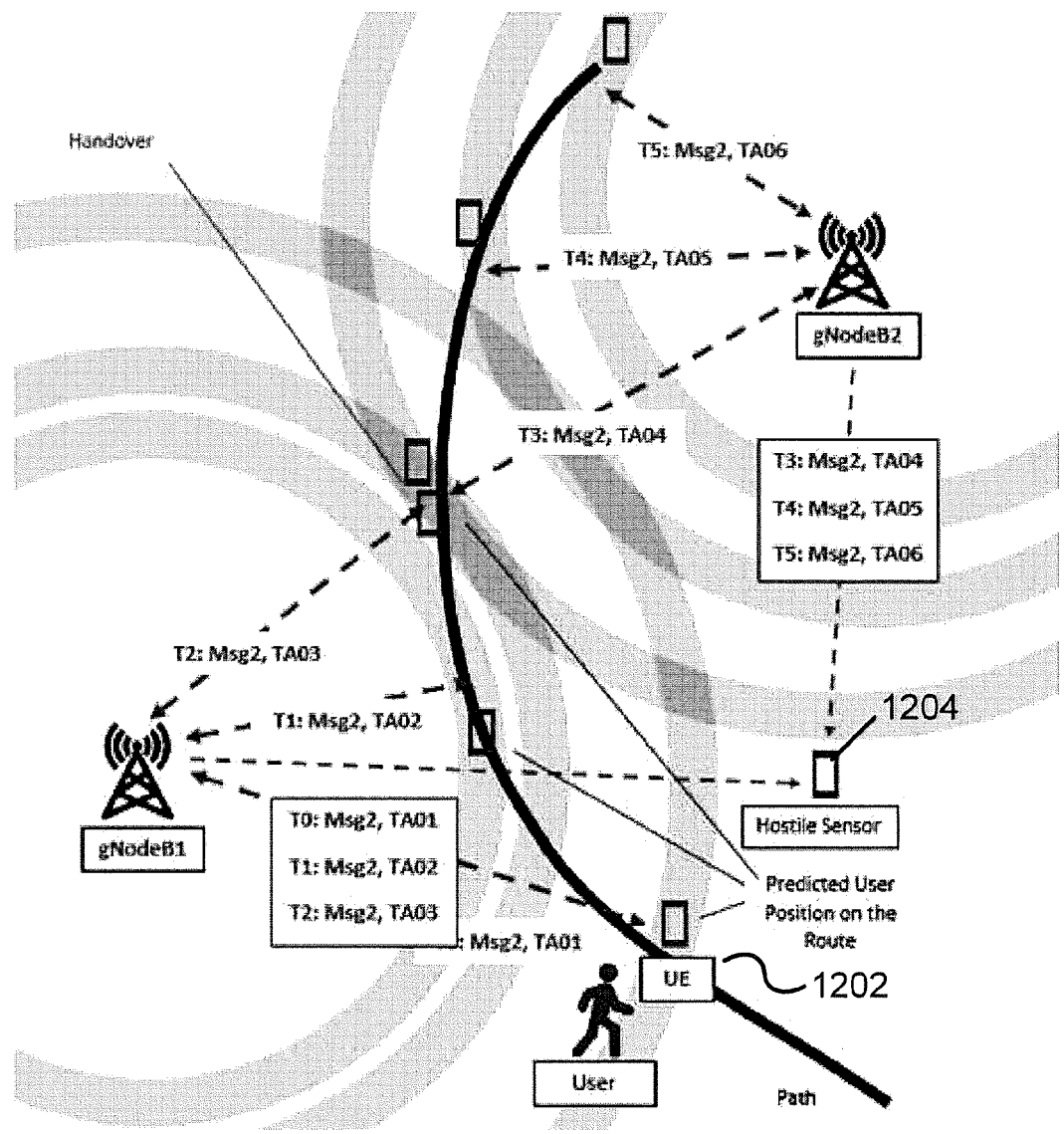
FIG. 11 illustrates the interception of RAR in a security-related network.

FIG. 11 illustrates the interception of RAR in a security-related network, and provides a second example, where UE 1202 and associated user location may be unlawfully monitored or tracked by the hostile sensor 1204. In this case, the user, who may patrol the given area by following the indicated path, may be tracked by RAR interception and TA Command decoding. This scenario may be relevant, for example, for perimeter monitoring, prisons, banks and monitoring of other sensitive infrastructures, where 5G or LTE may be used as the communication means in the safety- and security-related private network. By exploiting this vulnerability, TA data may be associated with the given path and time data, which, in turn, may reveal where the user may be at the given time, especially when the route is periodically traversed and statistical data from different periods is gathered. See the messages to the gNodeB1: at T0, Msg2 at TA01; at T1, Msg2 at TA02; at T2, Msg2 at TA03. See also the messages to the gNodeB2: at T3, Msg2 at TA04; at T4, Msg2 at TA05; at T5, Msg2 at TA06.

Figure 12:
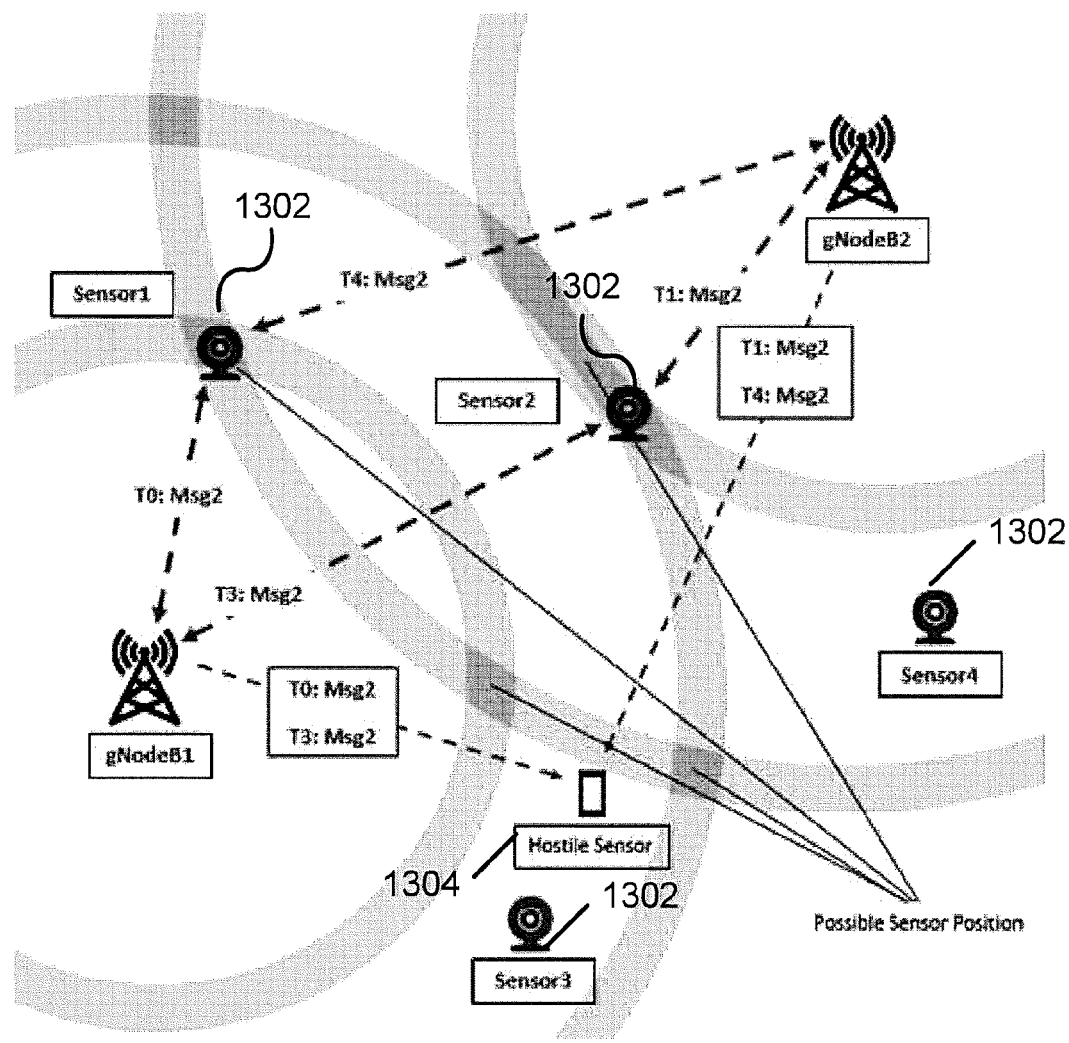
FIG. 12 illustrates the interception of RAR in a security-related 5G sensor grid.

FIG. 12 illustrates the interception of RAR in a security-related 5G (LTE) sensor grid, and provides a third example, where UEs 1302 may form a sensor grid, which may prevent unauthorized access to a given area. The sensors may be hidden and may be activated when an intruder is detected in the sensor perimeter. TA-related vulnerability may be exploited by placing a hostile sensor 1304, which may detect and record 5G (LTE) related transmissions, in the area.

As illustrated in FIG. 12, the hostile sensor 1304 may intercept RARs, which may be sent as a response for UE periodical synchronization connections. Thus, gathered data may reveal potential sensor positions to an intruder, who may then omit or neutralize them. See the messages to the eNodeB1 at T0 of Msg2 and at T3 of Msg2, and the messages to the eNodeB2 at T1 of Msg2 and at T4 of Msg2. Positioning may be possible as TA-ring intersections may indicate UE positions. If more hostile sensors are deployed, better accuracy of positioning may be expected.

Figure 13:
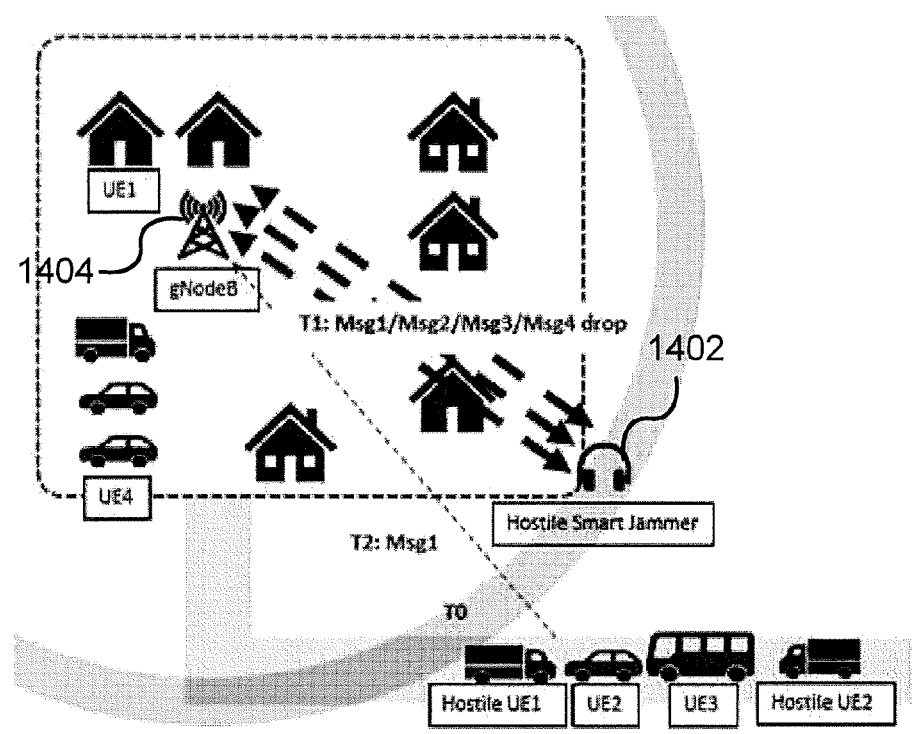
FIG. 13 illustrates the provision of RAR with TA in direct form in a smart jamming attack on RACH.

FIG. 13 illustrates the provision of RAR with TA in direct form in a smart jamming attack on RACH, and provides a fourth example, in which a Hostile Smart Jammer 1402 sends Msg1 toward gNodeB 1404 and receives a TA command in Msg2. Then, the jammer 1402 may perform a jamming attack on RACH to prevent connections from other authorized users and their UEs. As an example, a convoy scenario may be considered, which may be attacked, and in which 5G (LTE) communication may be used as a safety and security connection. The convoy includes a UE-2 and UE3, and may be attacked by a hostile UE1 and a hostile UE2 after communication is blocked by hostile smart jammer 1402.

In this case, the jammer 1402 may always receive accurate TA Command data, which may mean their jamming attack may be efficient.

In summary, the current 5G and LTE 3GPP solution for provision of a TA Command in a plain form in RAR may be considered to be a 5G and LTE safety- and security-related breach, especially if it is exploited by a potential hostile recipient. As indicated above, interception of RAR may be relatively simple task. In addition, UE identity may be not essential, as simple TA detection may confirm a presence of a given type of UE or associated user.

It is desired that this TA-Command-related vulnerability in the 5G and LTE standard be removed as it may expose the 5G and LTE infrastructure in safety- and security-related private networks or in military application to potential attacks, which in turn may degrade trust in the safety and security aspects of 5G and LTE techniques.

Figure 14:
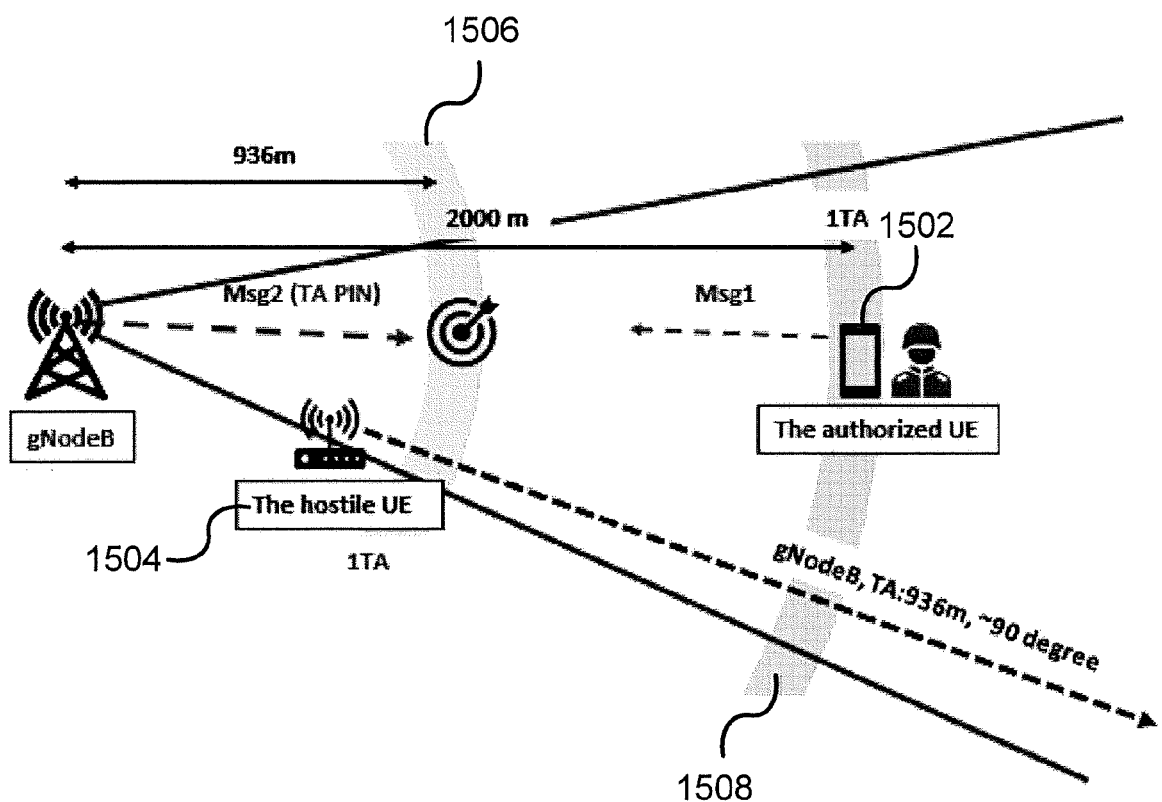
FIG. 14 illustrates the interception of RAR with TA in a coded form.
Figure 15:
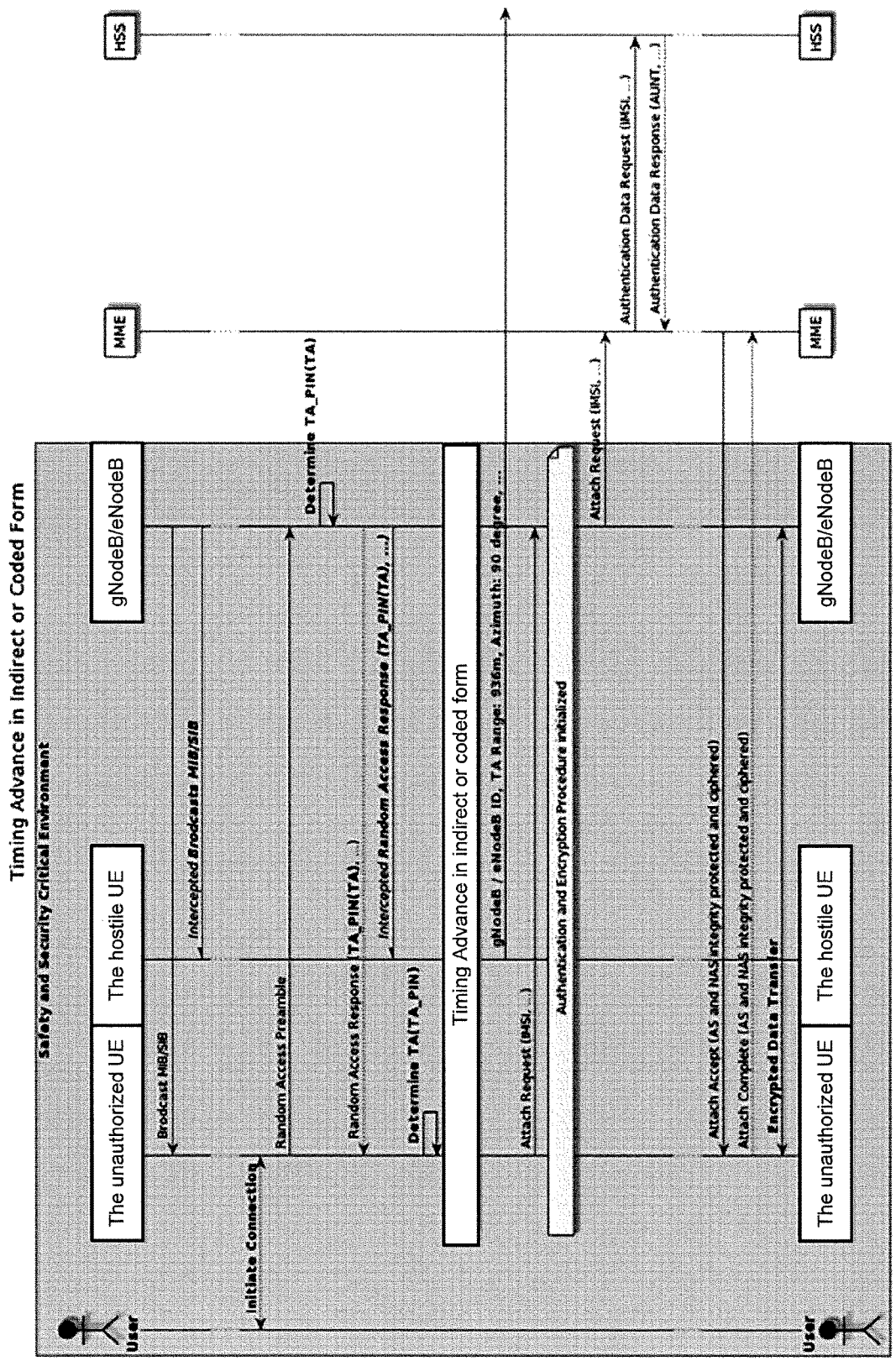
FIG. 15 illustrates the scenario shown in FIG. 14 from a signaling point of view.

The present disclosure may solve this TA Command safety- and security-related breach by provision of an RAR TA Command in coded form, which, even if RAR is intercepted, may point to another TA-related distance from the base station, as illustrated in FIGS. 14 and 15. FIG. 14 illustrates the interception of RAR with TA in a coded form, and FIG. 15 illustrates the scenario shown in FIG. 14 from a signaling point of view.

RAR TA Command coding may be based on a reference parameters set, which may be known both by the base station and by the UE. It means that the coding may be based on already available parameters. Thus, the base station may provide a TA Command in coded form, and the given UE may be able to decode a real TA Command value based on the same reference parameters set.

The size of the TA Command, that is, 11-bits in LTE and 12-bits in 5G, remains unchanged. For the purpose of explanation, TA_PIN may be used for RAR TA Command, if Timing Advance is provided in coded form.

The exact function used for TA Command coding and associated decoding may be implementation specific, and may be expressed in a general form, such as:

For TA coding by the Base Station, [Eq. 1]:

$$TA\_PIN = f(TA; SP; SFN, NT, PCI, SO);$$ [Eq. 1]

For TA_PIN decoding by the authorized UE, [Eq. 2]:

$$TA = f(TA\_PIN; SP; SFN, NT, PCI, SO),$$ [Eq. 2]

where, for example:

Selected Preamble, SP, which may be used by UE during RACH Preamble, Msg1, and which may be selected from the range indicated by the base station, System Frame Number, SFN, broadcasted in MIB, to which Msg1 was initially synchronized. The base station may be aware to which SFN the UE was synchronized and in which SFN Msg2 may be sent in a response to Msg1, Network Time, NT, which may be broadcasted by the network, for example, in SIB9, and UE may synchronize to this network time, Physical Cell Identifier, PCI, calculated based on transmitted PSS and SSS, which were used for synchronization, Specific Offset, SO, which may be specified by the operator as a static or a dynamic value.

As for another example, the scope of base station broadcasts (MIB/SIB, such as System Bandwidth, System Frame Number) and synchronization transmissions (PSS/SSS, for example Physical Cell Identifier) may be known for the given UE if it is in the given cell coverage. At the same time, the RACH Preamble selected by the given UE in Msg1 may be also be known by the base station if the given Msg1 is received.

Consequently, as illustrated in FIG. 14, if the RAR for the authorized UE 1502 is intercepted and decoded by the hostile UE 1504 without the knowledge about the RAR TA Command coding pattern, determined distance may point to a different range in arc 1506. As a result, the authorized UE 1502 and the associated user, which, in fact, may be located at a TA-related range in arc 1508, may be safe, as any potential hostile action may target a different area. This may be considered to be a safety- and security-related enhancement with respect to the scenario shown in FIG. 9.

FIG. 15 illustrates an example of a signaling diagram, in which, instead of a TA Command, TA_PIN may be included in an RAR. Thus, in comparison with FIG. 10, the potential hostile UE may provide misleading TA Command data to the potential hostile recipient. At the same time, the authorized UE may correctly decode received TA_PIN and apply a proper uplink channel timing adjustment.

For correct TA_PIN decoding, the knowledge about RAR TA Command coding pattern and exact values of the specified parameters set needs to be acquired, which may also include the scope of Msg1.

Although the present proposed method may be intended for 5G and LTE TA Command coding and decoding in order not to reveal the real UE and associated user position, the method may also be applied to the entire RAR Msg2 scope. It may mean that other parameters may also be provided in coded form.

In summary, by provision of an RAR TA command in coded form, for example, by TA_PIN, the UE and the associated user position with respect to a serving base station (TA range, estimated azimuth) may be not revealed to a potential hostile recipient, who may intercept the transmission. Thus, UE and user safety and security may be enhanced with respect to currently used solution in 5G and LTE 3GPP standards.

The present proposed method may solve the safety- and security-related problems, identified above, related to the provision of TA Command in plain form, which may be easily decoded if the RAR is intercepted.

With respect to the problem, illustrated in FIGS. 9 and 10, the result of the present method and the benefit intended by the method are illustrated in FIGS. 14 and 15. As explained above, if the RAR is intercepted, decoded TA Command in the form of TA_PIN, points to another TA-related range ring. Thus, a higher level of safety and security may be expected, as 5G/LTE connection does not provide insight for UE and user exact position.

When considering military applications or safety- and security-related private networks, the coding function [Eq. 1] and the associated decoding function [Eq. 2] and parameters set may be specified in advance.

TA Command or RAR scope coding and decoding rules and associated parameters set may be also delivered to UE when UE is in RRC Connected state. New rules may be applied from the next connection or from a specified time, which may mean that authorized UEs may be prepared for new rules related to RAR processing.

In another embodiment, the rules may be hardcoded or secretly delivered to the authorized UE and stored inside its internal memory.

It should also be noted that, if Msg1 scope is also used for RAR coding, which may also include other parameters that selected preamble, that is, binary representation, Msg1 also needs to be intercepted, if the hostile UE would like to decode TA_PIN, if it is aware about the coding and decoding rules.

Figure 16:
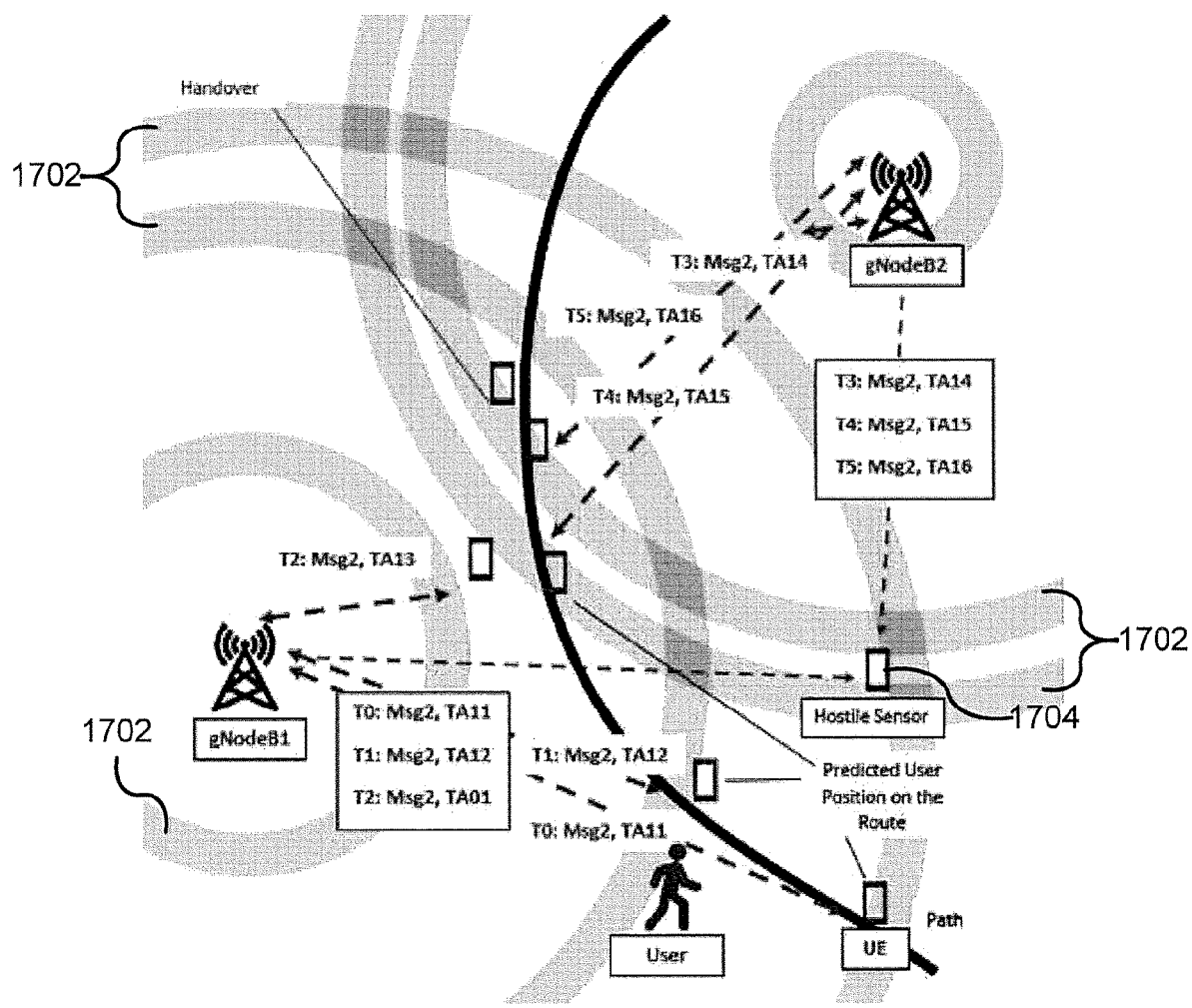
FIG. 16 illustrates the benefit of the present method in the use case, shown in FIG. 11.

FIG. 16 illustrates the benefit of the present method in the second use case, shown in FIG. 11. As illustrated, consecutive TA Command range rings, represented by arcs 1702 due to coding (TA_PIN) may have different values when interpreted directly by the potential hostile sensor 1704. Randomized TA values may intersect with the path at different points, and there may be no relation between consecutive reports, which may suggest path traversing. In this way, the data provided may not be easily associated with the user's motion on the given path, as was the case in FIG. 11. Thus, a 5G and LTE RAR TA Command safety- and security-related breach may not be efficiently exploited by the hostile recipient for the unauthorized tracking of the UE and the associated user.

Figure 17:
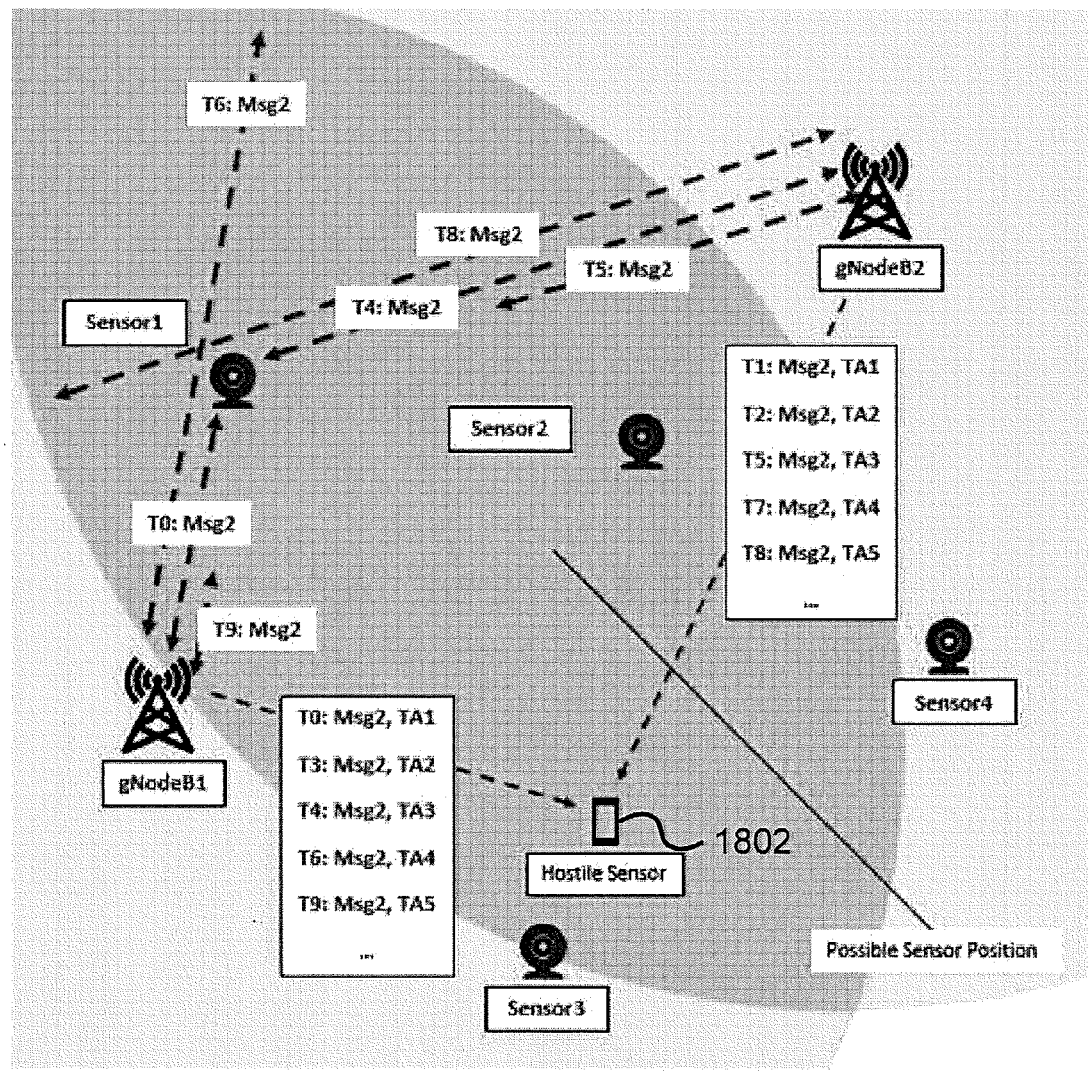
FIG. 17 illustrates the benefit of the present method in the use case, shown in FIG. 12.

FIG. 17 illustrates the benefit of the present method in the third use case, shown in FIG. 12. As illustrated, when the sensors in the sensor grid initiate an RRC Connection with 5G/LTE base station, at different times they may receive RAR with a different TA_PIN, which may suggest that the sensor is at motion. Thus, if more data is gathered by the hostile sensor 1802, the more potential sensor locations may be assumed, as there may be more areas when TA rings from different base station intercepts.

This means that sensor location may not be revealed by TA Command interception, which may improve resilience of the sensor grid for potential penetration by an intruder, who may utilize the knowledge about sensor location to omit them or simply neutralize them.

Figure 18:
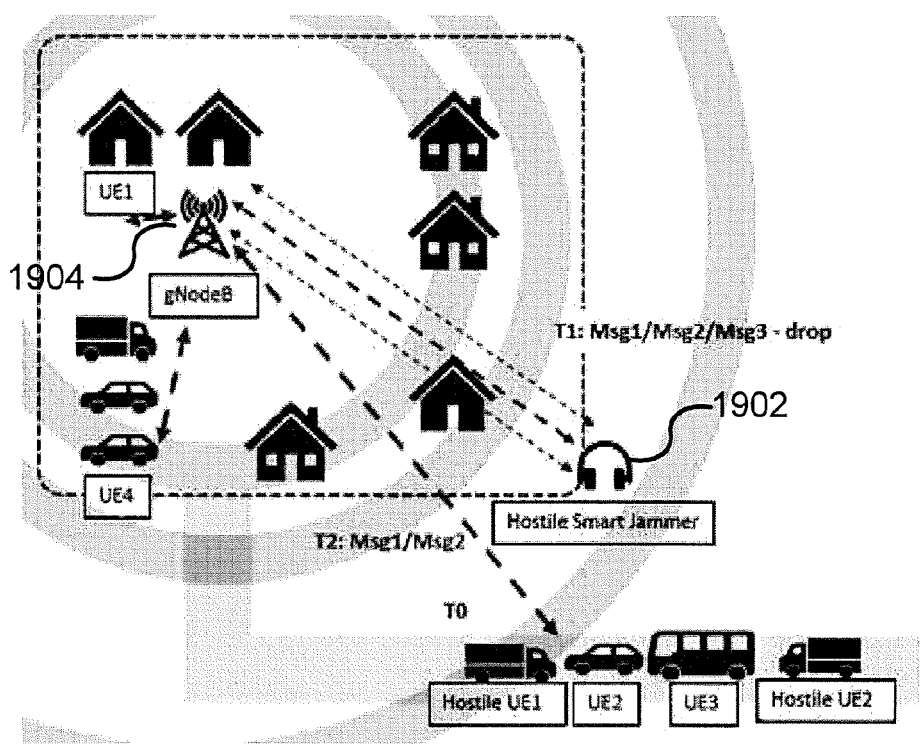
FIG. 18 illustrates the benefit of the present method in the use case, shown in FIG. 13.

FIG. 18 illustrates the benefit of the present method in the fourth use case, shown in FIG. 13. As illustrated, the jammer or jammers 1902 may be deployed near the base station 1904, which may be activated in order to block emergency communication with the convoy. The jammer 1902 may perform a smart attack on RACH by sending many Msg1, which typically should be answered by the base station, which in turn may saturate the Random Access Channel. As the base station provides an accurate TA Command, in FIG. 13, such attack may be efficient. Also, the jammer 1902 may send next messages which may further drain base station radio resources.

However, if at different times, in FIG. 18, TA_PIN may have a different value and the jammer 1902 may be unaware about the pattern, jamming may be less efficient as it may not fit to RACH hearing window. Also, the subsequent messages, for example, Msg3, may not fit to proper window and, finally, radio resources may not be used efficiently.

As explained in these four exemplary use cases, illustrated in FIGS. 14, 16, 17, and 18, by the provision of an RAR TA Command in coded form, an increased safety and security level may be expected with respect to the current 5G and LTE 3GPP standard solution. This may mean that the proposed methods may be in valuable for military and government, and also in safety- and security-related private networks.

An exemplary TA coding and decoding procedure is now described.

RAR TA Command coding may be performed at the base station, after Msg1 is received from the given UE, as illustrated on FIG. 15. During this step, calculated by the base station, a legacy Timing Advance value may be converted to TA_PIN form by the function [Eq. 1] with the use of defined parameters sets, which may be known both for the base station and for the given UE through broadcasts or received transmissions or by specified settings. TA_PIN may then be included in RAR and may replace the TA Command. No other signaling may be required to implement present method.

Figure 19:
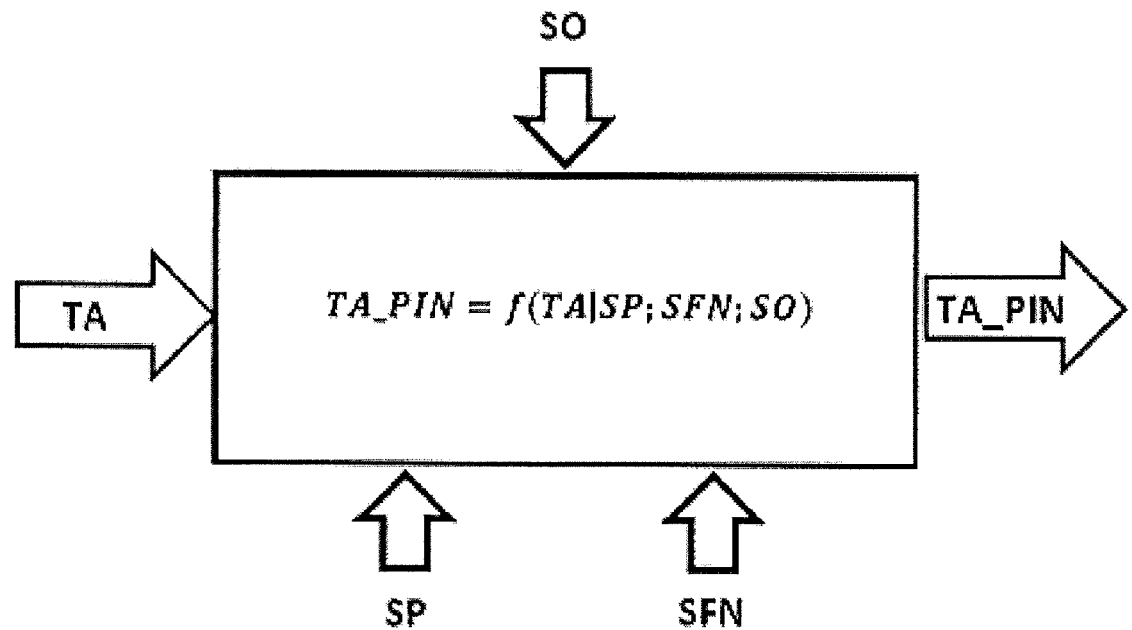
FIG. 19 illustrates a simplified example of a block diagram for RAR TA Command coding at a base station.

FIG. 19 illustrates a simplified example of a block diagram for RAR TA Command coding at a base station prior to sending Msg2, in which, as a parameter set, may be the used legacy TA value, Selected Preamble SP from Msg1, System Frame Number SFN from MIB (corresponding to SFN related to received Msg1 or to SFN related to RAR, which may be sent) and Specific Offset SO, which may be configured by the Operator or the Authorized User, as additional protection means. A coding function may be expressed by [Eq. 3] and may correspond to sum of TA value and other parameters with respect to their value ranges and periodicity:

$$TA\_PIN=TA+(SP+SFN+SO). \quad [Eq. 3]$$

Figure 20:
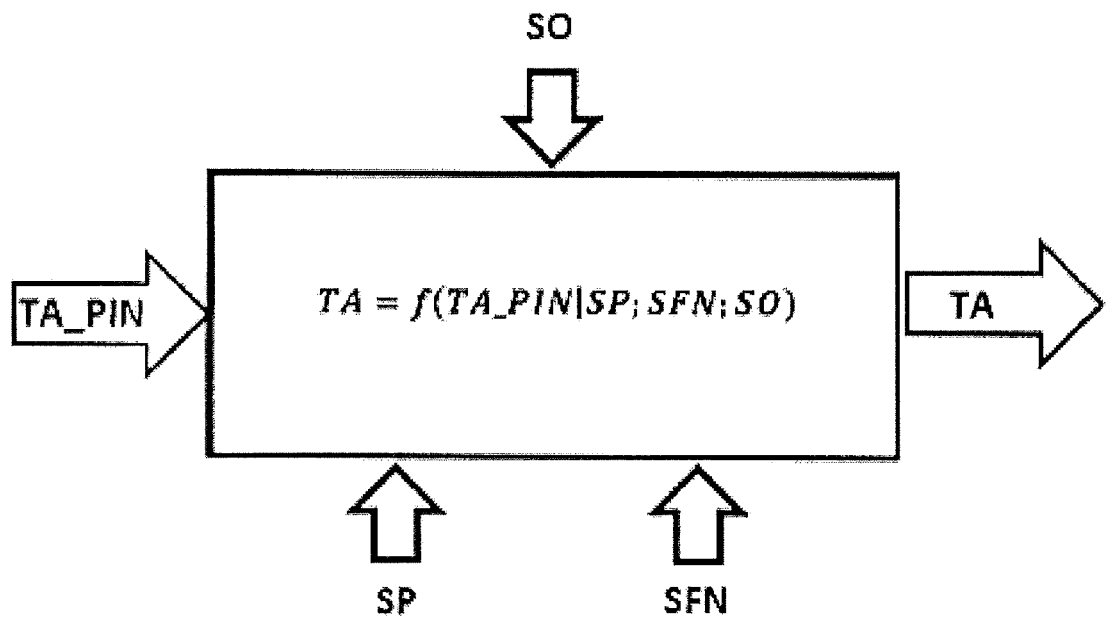
FIG. 20 illustrates a simplified example of a block diagram for RAR TA Command decoding at a given UE.

FIG. 20 illustrates a simplified example of a block diagram for RAR TA Command decoding at the given UE after reception of Msg2, in which the same parameter set may be used as in coding. A decoding function may be expressed by [Eq. 4] and may correspond to difference of TA value and other parameters with respects to their value ranges and periodicity:

$$TA=TA\_PIN-(SP+SFN+SO) \quad [Eq. 4]$$

FIG. 21 illustrates an RAR TA Command coding process [Eq. 3] performed at the base station. Data in FIG. 21 are illustrative in character and are not intended to be limiting. Calculations may correspond to the first scenario illustrated in FIG. 14. For ease of reference, the values described in FIG. 21 are surrounded by ovals. As may be seen, at time 00:00, the UE and the associated user may be at the distance of 2000 m with respect to the base station, which may correspond to the 5G TA Command being equal to a value of 820. The UE may select preamble SP with value 20, and specific offset SO may be set to a value of 265. Msg1 may be sent with respect to downlink SFN equal to 983. As a result, corresponding TA_PIN value, which may be used instead of TA Command provided in plain form, may be equal to a value of 2088. Using Eq. 3 above: 820+(20+983+265)=2088.

As is further illustrated, the same, static UE may receive different TA_PIN values in different times, such as at 05:00 and 10:00. It should be noted that certain parameters may have different values due to random selection, for example, Selected Preamble SP, incremented value; with respect to value ranges, for example, SFN; or may have the same value, for example, specific offset SO. If the UE is in motion, also required TA value may be different.

Reference 2110 indicates the values of the TA command that may be sent with LTE and 5G via MSG2 in accordance with an exemplary embodiment herein. Reference 2120 indicates the values of the TA command that would be sent with LTE and 5G via MSG2 in accordance with current practice. Reference 2130 has two notes indicating both the authorized UE and the unauthorized UE are static (i.e., not moving). This can be seen for the authorized UE because the TA is the same for each time.

FIG. 22 illustrates an RAR TA Command decoding process [Eq. 4] performed at the authorized UE. Data in FIG. 22 are illustrative in character and are not intended to be limiting. Calculations may correspond to the first scenario illustrated in FIG. 14.

As illustrated in FIG. 22, the authorized UE may receive an RAR TA Command in the form of TA_PIN with value for 5G equal to the value of 2088 at 00:00. After applying decoding function [Eq. 4], the true TA Command value may be retrieved from TA_PIN and may be equal to the value of 820, the same as calculated by the base station. As per Eq. 4, TA=2088−(20+983+265)=820. Distance value remains unchanged during the next connection, assuming UE is static. Also, if the UE is in motion, correct TA values may be determined accordingly.

However, if the received in RAR TA Command value, that is, 2088 (TA_PIN) is considered to be a plain value, it may point to different range ring, that is, for 5G 5094.72 m, whereas the UE and the associated user are at 2000 m. Note that 5094.72 m uses a comma as a decimal point separator instead of a period (both 5094,72 and 5094.72 are equivalent). These distance values may be different in the next connections, which may also suggest that UE is in motion, even if it remains static. 5094.72 m refers to Timing Advance value 2088, i.e., 2088×2.44 m=5094.72 m. However, 2088 is TA_PIN, which needs to be correctly interpreted by UE as per Eq.4 above. It means that in fact UE is at distance corresponding to TA=820. In another words, any hostile UE will use TA Command equal 2088 and friendly/authorized UE will use correct TA Command equal 820.

The notes 1 and 2 indicate that the authorized UE distance is static in the consecutive connection periods, see the authorized UE corresponding distances of LTE of 2028 m and for 5G of 2001 m. Meanwhile the unauthorized UE distance may look to be dynamic in the consecutive connection period, wee the authorized UE corresponding distance for LTE and 5G, both of which vary over time.

Msg2 during handover is now described in examples.

Figure 23:
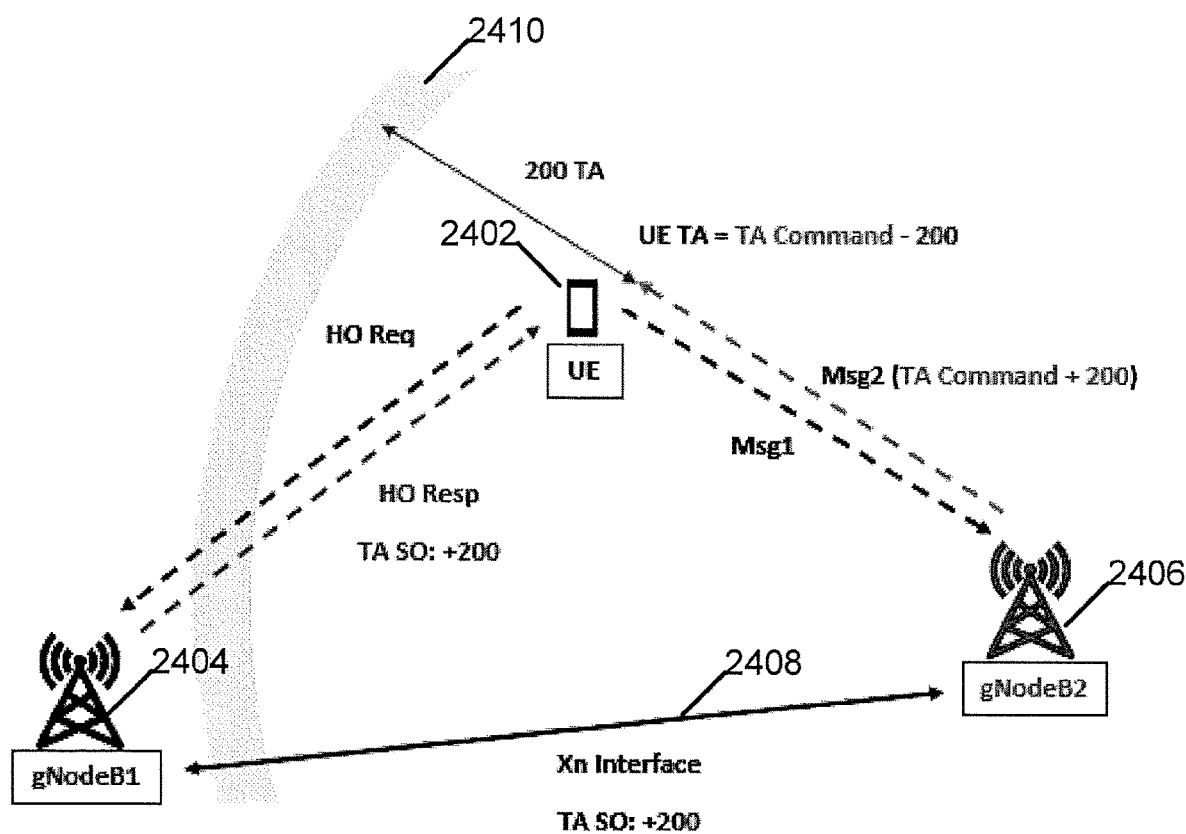
FIG. 23 illustrates the interception of RAR with TA in a coded form in a handover situation.

As illustrated in FIG. 23, due to user mobility, a UE may periodically need to perform handover to the next base station, which requires a RACH procedure.

In handover, TA Command security may be additionally improved by applying a specified random TA Static or Specific Offset. As shown in FIG. 23, a UE 2402 may request handover HO Req to the specified neighbor cell. The Source Cell, gNodeB1 2404, may accept the HO request (via the indicated handover response, HO Resp) and initial UE data exchange to the Target Cell, gNodeB2 2406. The Source Cell, gNodeB1 2404, may confirm handover by sending HO Resp to the UE 2402, and additionally include specified TA Static or Specific Offset, for example, TA SO=+200.

The same TA Static or Specific Offset, TA SO=+200, may be sent by dedicated signaling for 5G Xn interface 2408 (LTE: X2 or S1).

The Target Cell, gNodeB2 2406, may be aware about handover procedure for the given UE 2402 as it may be executed by Contention Free RACH. Thus, when gNodeB2

2406 receives Msg1 from the UE 2402 with a specified Preamble, it may respond with Msg2 with a modified TA Command, which may include TA SO=+200 TA correction. The TA Command includes the actual TA also, such as the TA Command including TA+200 in the TA Command.

In this context, if RAR is intercepted, the provided TA Command may have misleading character, as it may position the UE on a different range ring 2410, that is +200 TA with respect to the real position, as in FIG. 23. Thus, additional TA Command security may be achieved.

The UE, which performs the handover procedure may deduct from received gNodeB2 2406 TA Command a TA SO=+200 and may apply correct Timing Advance for uplink channel timing adjustment.

For instance, in an example, if the true TA is 800, the TA Command from the gNodeB 2406 would be 800+200=1000. The UE receives the 1000 and knows to subtract the +200 from the 1000 to arrive at the true TA of 800. This is indicated in FIG. 23 by the "UA TA=TA Command −200". The UE performs the opposite calculation from what the SO is, e.g., subtracting 200 when the SO is +200.

It is noted that the value of +200 is merely an example. It is also noted that it may be useful to cover the case when the calculated TA may be out of range, i.e., which for LTE TA the maximum is 1282; and for 5G is 3846. For instance, the UE may be at 1200 (with respect to gNodeB2) so when TA SO+200 should be added, the result could be 1400. In such case, gNodeB2 may report 1400−1282=118. On the UE side, the UE may be aware that TA SO offset+200 was added, so it subtracts TA SO 200 from received TA value, i.e., 118−200=−82 and then uses this in the calculation 1282−82=1200 (TA is positive).

It is additionally noted that, in general, the handover procedure is quite complicated. There are many signaling massages between UE and the Source gNB and between Source and Target gNB, not to mention other signaling. There may be also some difference between 5G and LTE in handover procedures. The example of FIG. 23 illustrates a UE-initiated handover. There are other handovers, e.g., where based on UE measurements the source gNB initiates handover. For this example, the Handover Command is one of multiple possible messages to use to deliver TA SO to the UE.

In summary, the present methods are intended to cover a security breach related to the provision of Msg2 RAR TA Command in plain form, which enables unauthorized UE positioning, may compromise user position, or may be used for efficient smart jamming attacks. Therefore, this vulnerability may be further exploited by unauthorized or hostile parties, who may compromise systems, which may be based on 5G or LTE standards. RAR Msg2 interception and decoding is not a complicated process as all required data may be broadcasted by the base station.

In the present methods, RAR TA Command may be provided in coded form, TA_PIN, but the authorized UE may be able to correctly decode to proper TA value required for uplink channel timing adjustment.

The present methods may also be applied for coding and decoding the entire Msg2 scope, which may further improve safety and security aspects related to 5G and LTE applications in military or government applications, and also in private networks, in which higher safety and security standards may be required.

Any unauthorized recipient, which may intercept RAR and decode its scope, including TA Command field, may receive misleading data as TA_PIN in plain form may point to different TA related range rings.

The four evaluated use cases discussed above explain how this security breach may be used against 5G and LTE infrastructure or directly against UE and the associated user.

The following are additional examples.

Example 1. A method, comprising:
determining, by a base station in a wireless network, a true timing advance for a user equipment in the wireless network;
coding, by the base station, the true timing advance to a coded timing advance; and
sending, by the base station toward the user equipment, the coded timing advance.

Example 2. The method of example 1, wherein coding the true timing advance to a coded timing advance further comprises applying a function to a value of the timing advance and one or more additional values to form the coded timing advance.

Example 3. The method of example 2, wherein applying the function to the value of the timing advance and one or more additional values comprises applying the following function:

TA_PIN=$f$(TA;SP;SFN,NT,PCI,SO), where:
$f(\bullet)$ is the function;
TA_PIN is a value of the coded timing advance;
TA is the value of the timing advance;
SP is a value for a selected preamble;
SFN is a system frame number;
NT is a value of a network time;
PCI is a value of a physical cell identifier; and
SO is a value for a specific offset.

Example 14. The method of example 3, wherein the NT is broadcasted by the base station and the PCI is calculated by the base station based on transmitted a primary synchronization signal and a secondary synchronization signal, which are used for synchronization between the base station and the user equipment.

Example 5. The method of either example 3 or 4, wherein:
the SP is to be selected by the user equipment from a range of values indicated by the base station;
the SFN is broadcasted by the base station toward at least the user equipment; and
the SO is specified as one of a static value or a dynamic value.

Example 6. The method of any of the above examples, wherein the sending, by the base station toward the user equipment, the coded timing advance further comprises sending the coded timing advance in a random access response message of a random access channel procedure between the base station and the user equipment.

Example 7. A method, comprising:
receiving, by a user equipment in a wireless network, a coded timing advance from a base station in the wireless network; and
determining, by the user equipment based on the coded timing advance, a true timing advance for the user equipment to use for communications with the base station.

Example 8. The method of example 7, wherein determining the true timing advance further comprises applying a function to a value of the coded timing advance and one or more additional values to form the true timing advance.

Example 9. The method of example 8, wherein applying the function to the value of the timing advance and one or more additional values comprises applying the following function:

TA=f(TA_PIN;SP;SFN,NT,PCI,SO), where:
f(●) is the function;
TA is the value of the timing advance;
TA_PIN is a value of the coded timing advance;
SP is a value for a selected preamble;
SFN is a system frame number,
NT is a value of a network time;
PCI is a value of a physical cell identifier, and
SO is a value for a specific offset.

Example 10. The method of example 9, wherein the NT is received from the base station and the PCI is received from the base station.

Example 11. The method of either example 9 or 10, wherein:
the SP is selected by the UE from a range of values indicated by the base station;
the SFN is received from the base station; and
the SO is specified as one of a static value or a dynamic value.

Example 12. The method of any one of examples 7 to 11, wherein the receiving the coded timing advance further comprises receiving the coded timing advance in a random access response message of a random access channel procedure between the base station and the user equipment.

Example 13. A method, comprising:
determining, by a source base station in response to a handover of a user equipment from the source base station to a target base station, an offset to be used to determine a value of a true timing advance between the user equipment and the target base station; and
sending by the source base station the offset toward the user equipment and the target base station during a handover process for the handover.

Example 14. A method, comprising:
receiving, by a user equipment as part of a handover process from a source base station to a target base station, an offset from the source base station to be used to determine a value of a true timing advance between the user equipment and the target base station;
receiving a coded timing advance from a target base station during the handover process; and
determining the value of the true timing advance by adjusting the received coded timing advance with the received offset.

Example 15. The method of example 14, further comprising using by the user equipment the true timing advance to communicate with the target base station.

Example 16. A method, comprising:
receiving, by a target base station in response to a handover of a user equipment from a source base station to the target base station, an offset to be used to determine a value of a true timing advance between the user equipment and the target base station;
adjusting the true timing advance using the received offset to form a coded timing advance; and
sending the coded timing advance from the target base station toward the user equipment.

Example 17. The method of example 16, further comprising using by the target base station the true timing advance to communicate with the user equipment.

Example 18. An apparatus comprising: at least one processor, and at least one memory including computer program code; the at least one memory and the computer program code are configured to, with the at least one processor, cause the apparatus at least to perform the method of any of examples 1-6, the method of any of examples 7-12, the method of example 13, the method of any of examples 14-15, or the method of any of examples 16-17.

Example 19. An apparatus comprising: means for performing the method of any of examples 1-13, the method of any of examples 1-6, the method of any of examples 7-12, the method of example 13, the method of any of examples 14-15, or the method of any of examples 16-17.

Example 20. A non-transitory computer readable medium comprising program instructions for causing an apparatus to perform at least the method of any of examples 1-6, the method of any of examples 7-12, the method of example 13, the method of any of examples 14-15, or the method of any of examples 16-17.

In general, the various exemplary embodiments may be implemented in hardware or special purpose circuits, software, logic or any combination thereof. For example, some aspects may be implemented in hardware, while other aspects may be implemented in firmware or software, which may be executed by a controller, microprocessor or other computing device, although the exemplary embodiments are not limited thereto.

While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should thus be appreciated that at least some aspects of the exemplary embodiments of the disclosure may be practiced in various components, such as integrated circuit chips and modules, and that the exemplary embodiments of this disclosure may be realized in an apparatus that is embodied as an integrated circuit. The integrated circuit, or circuits, may comprise circuitry, as well as possibly firmware, for embodying at least one or more of a data processor or data processors, a digital signal processor or processors, baseband circuitry and radio frequency circuitry that are configurable so as to operate in accordance with the exemplary embodiments of this disclosure.

Various modifications and adaptations to the foregoing exemplary embodiments of this disclosure may become apparent to those skilled in the relevant arts in view of the foregoing description, when read in conjunction with the accompanying drawings. For example, while the exemplary embodiments have been described above in the context of advancements to the 5G NR system, it should be appreciated that the exemplary embodiments of this disclosure are not limited for use with only this one particular type of wireless communication system. The exemplary embodiments of the disclosure presented herein are explanatory and not exhaustive or otherwise limiting of the scope of the exemplary embodiments.

The terminology used herein is for the purpose of describing particular embodiments only and is not intended to be limiting of the disclosed embodiments. As used herein, the singular forms "a", "an", and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

The description of the present exemplary embodiments has been presented for purposes of illustration and description, but is not intended to be exhaustive or limited to the embodiments in the form disclosed. Many modifications and variations will be apparent to those of ordinary skill in the art without departing from the scope and spirit of the present disclosure. The embodiments were chosen and described in order to best explain the principles of the disclosure and the practical application, and to enable others of ordinary skill in the art to understand the disclosure for various embodiments with various modifications as are suited to the particular use contemplated.

Various modifications and adaptations may become apparent to those skilled in the relevant arts in view of the foregoing description, when read in conjunction with the accompanying drawings. However, any and all modifications of the teachings of this disclosure will still fall within the scope of the non-limiting embodiments thereof.

Although described in the context of particular embodiments, it will be apparent to those skilled in the art that a number of modifications and various changes to these teachings may occur. Thus, while the examples have been particularly shown and described with respect to one or more disclosed embodiments, it will be understood by those skilled in the art that certain modifications or changes may be made therein without departing from the scope of the disclosure as set forth above, or from the scope of the claims to follow.

The following abbreviations that may be found in the specification and/or the drawing figures are defined as follows:

BS Base Station
CQI Channel Quality Information
CRI CSI-RS Resource Indicator
CSI Channel State Information
CSI-RS CSI Reference Signal
DL Downlink
DNS Domain Name System
DoS Denial of Service
FBS False (or Fake) Base Station
FBS/BS part of FBS appearing as a BS to a victim UE
FBS/UE part of FBS appearing as a UE to an LBS
gNB gNodeB (5G Base Station)
IMCP Internet Control Message Protocol
IMSI International Mobile Subscriber Identity
IoT Internet of Things
LBS Legitimate Base Station
LI Layer Indicator
LTE Long Term Evolution
MAC Medium Access Control
MIB Master Information Block
MitM-FBS Man-in-the Middle FBS
NAS Non-Access Stratum
NB Narrow Band
NR New Radio (5G)
NW Network
PARLOS Provision of Access to Restricted Local Operator Services
PBCH Physical Broadcast Channel
PDCP Packet Data Convergence Protocol
PMI Precoding Matrix Indicator
PRS Positioning Reference Signal
PSS Primary Synchronization Signal
RACH Random Access Channel
RAR Random Access Response
RI Rank Indicator
RLC Radio Link Control
RRC Radio Resource Control
RS Reference Signal
RSRP Reference Signal Received Power
RX Receiver
SFN System Frame Number
SIB System Information Block
SS Synchronization Signal
SSRBI SS/PBCH Resource Block Indicator
SSS Secondary Synchronization Signal
TA Timing Advance
TA_PIN RAR TA Command in coded form
TX Transmitter
UE User Equipment
UL Uplink
WAN Wide-Area Network
3GPP 3rd Generation Partnership Project
5G 5th Generation

What is claimed is:

1. An apparatus, comprising:
    at least one processor; and
    at least one memory storing instructions that, when executed by the at least one processor, cause the apparatus at least to perform:
    determining a true timing advance for a user equipment in a wireless network;
    coding the true timing advance to a coded timing advance by applying a function to a value of the true timing advance and one or more additional values to form the coded timing advance, and wherein applying the function to the value of the true timing advance and one or more additional values comprises applying the following function:

$TA\_PIN = f(TA; SP; SFN, NT, PCI, SO)$, wherein:
        $f(\bullet)$ is the function,
        TA_PIN is a value of the coded timing advance,
        TA is the value of the true timing advance,
        SP is a value for a selected preamble,
        SFN is a system frame number,
        NT is a value of a network time,
        PCI is a value of a physical cell identifier, and
        SO is a value for a specific offset; and
    sending, toward the user equipment, the coded timing advance.

2. The apparatus of claim 1, wherein the NT is broadcasted by the apparatus and the PCI is calculated by the apparatus based on a transmitted primary synchronization signal and a transmitted secondary synchronization signal for synchronization between the apparatus and the user equipment.

3. The apparatus of claim 1, wherein:
    the SP is selected by the user equipment from a range of values indicated by the apparatus;
    the SFN is broadcasted by the apparatus toward at least the user equipment; and
    the SO is one of a static value or a dynamic value.

4. The apparatus of claim 1, wherein the sending, toward the user equipment, the coded timing advance comprises sending the coded timing advance in a random access response message of a random access channel procedure between the apparatus and the user equipment.

5. An apparatus, comprising:
    at least one processor; and at least one memory storing instructions that, when executed by the at least one processor, cause the apparatus at least to perform:

receiving a coded timing advance from a base station in a wireless network; and determining, based on the coded timing advance, a true timing advance for the apparatus to use for communications with the base station, wherein the true timing advance is determined by applying a function defined as:

TA_PIN=$f$(TA;SP;SFN,NT,PCI,SO), wherein:
f(●) is the function,
TA_PIN is a value of the coded timing advance,
TA is the value of the true timing advance,
SP is a value for a selected preamble,
SFN is a system frame number,
NT is a value of a network time,
PCI is a value of a physical cell identifier, and
SO is a value for a specific offset.

6. The apparatus of claim 5, wherein the NT is received from the base station and the PCI is received from the base station.

7. The apparatus of claim 5, wherein:
the SP is selected by the apparatus from a range of values indicated by the base station;
the SFN is received from the base station; and
the SO is one of a static value or a dynamic value.

8. The apparatus of claim 5, wherein the receiving the coded timing advance comprises receiving the coded timing advance in a random access response message of a random access channel procedure between the base station and the apparatus.

9. A method, comprising:

receiving, by a user equipment in a wireless network, a coded timing advance from a base station in the wireless network; and determining, by the user equipment based on the coded timing advance, a true timing advance for the user equipment to use for communications with the base station, wherein the true timing advance is determined by applying a function defined as:

TA_PIN=$f$(TA;SP;SFN,NT,PCI,SO), wherein:
f(●) is the function,
TA_PIN is a value of the coded timing advance,
TA is the value of the true timing advance,
SP is a value for a selected preamble,
SFN is a system frame number,
NT is a value of a network time,
PCI is a value of a physical cell identifier, and
SO is a value for a specific offset.

10. The method of claim 9, wherein the NT is received from the base station and the PCI is received from the base station.

11. The method of claim 9, wherein:
the SP is selected by the user equipment from a range of values indicated by the base station;
the SFN is received from the base station; and
the SO is one of a static value or a dynamic value.

12. The method of claim 9, wherein the receiving the coded timing advance comprises receiving the coded timing advance in a random access response message of a random access channel procedure between the base station and the user equipment.

* * * * *